United States Patent
Tsumura et al.

(10) Patent No.: US 6,704,067 B2
(45) Date of Patent: Mar. 9, 2004

(54) LIQUID CRYSTAL DISPLAY APPARATUS

(75) Inventors: Makoto Tsumura, Hitachi (JP);
Akitoyo Konno, Hitachi (JP);
Tsunenori Yamamoto, Hitachi (JP);
Ikuo Hiyama, Hitachinaka (JP);
Yoshinori Aono, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/385,639

(22) Filed: Mar. 12, 2003

(65) Prior Publication Data

US 2003/0169379 A1 Sep. 11, 2003

Related U.S. Application Data

(63) Continuation of application No. 10/101,159, filed on Mar. 20, 2002.

(30) Foreign Application Priority Data

Oct. 30, 2001 (JP) ........................................ 2001-331844

(51) Int. Cl.[7] ............................................... G02F 1/136
(52) U.S. Cl. ........................................ 349/42; 349/141
(58) Field of Search ............................ 349/38, 39, 42, 349/43, 54, 139, 141, 143, 144

(56) References Cited

U.S. PATENT DOCUMENTS

| | | | | |
|---|---|---|---|---|
| 5,164,851 A | * | 11/1992 | Kanemori et al. | 349/55 |
| 5,333,004 A | * | 7/1994 | Mourey et al. | 345/92 |
| 5,825,438 A | * | 10/1998 | Song et al. | 349/54 |
| 6,014,190 A | * | 1/2000 | Kim et al. | 349/39 |

FOREIGN PATENT DOCUMENTS

| | | |
|---|---|---|
| JP | 6-148596 | 5/1994 |
| JP | 6-202073 | 7/1994 |
| JP | 6-202127 | 7/1994 |

OTHER PUBLICATIONS

"Fundamental Deterioration of Picture Quality for Moving Images Displayed on LCDs and Methods for Improvement", T. Kurita, NHK Science and Technical Research Laboratories, pp. 13–18.

* cited by examiner

Primary Examiner—Kenneth Parker
Assistant Examiner—David Chung
(74) Attorney, Agent, or Firm—Antonelli, Terry, Stout & Kraus, LLP

(57) ABSTRACT

A liquid crystal display apparatus having a pair of substrates of which at least one is transparent; and a liquid crystal layer supported between the pair of substrates, in which one of the pair of substrates has a plurality of row lines and a plurality of row lines, and pixels are placed corresponding to intersections of the plurality of row lines and the plurality of row lines. A first pixel electrode and a second pixel electrode are provided in the pixel, and a first active element is placed in the pixel and an output terminal thereof is connected to one row line adjacent to the first pixel electrode and the pixel, and a second active element is placed in the pixel and its output is connected to the other row line adjacent to the second pixel electrode. The first and second active elements are brought into conduction during a period of writing a voltage to a liquid crystal, and the first and second active elements are brought into a high resistance state during a holding period, and a difference voltage between the adjacent row lines is applied to the liquid crystal to display an image. A capacitance between the row line and the first pixel electrode and that between the row line and the second pixel electrode are equal as to each row line adjacent to the pixel.

11 Claims, 19 Drawing Sheets

LIQUID CRYSTAL DISPLAY APPARATUS

CROSS REFERENCE TO RELATED APPLICATION

This is a continuation of U.S. application Ser. No. 10/101,159, filed March 20, 2002, the subject matter of which is incorporated by reference herein.

BACKGROUND OF THE INVENTION

The present invention relates to a liquid crystal display apparatus, and in particular, to the apparatus capable of curbing image quality degradation due to crosstalk and implementing high image quality and reduction of driving voltage and power consumption.

The liquid crystal display apparatus is widely used as a display portion of mobile equipment represented by a notebook PC and a portable telephone taking advantage of its characteristics of low profile, light weight and super low power consumption, and is beginning to be widespread as a monitor for a desktop PC and a liquid crystal television because it shows performance superior to the display apparatuses such as a CRT (Cathode Ray Tube) in-terms of low profile, light weight, high-resolution display and so on.

As for a display principle of the liquid crystal display, an IPS mode (In-plane Switching Mode) characterized by a wide viewing angle, MVA (Multi Domain Vertical Alignment), OCB (Optically Compensated Birefringence) and so on are used in addition to mainstream TN (Twisted Nematic).

Among these display modes, the in-plane switching mode has an excellent viewing angle characteristic and is capable of gathering on one of the substrates almost all the components of a liquid crystal panel such as active elements, electrodes and a color filter in addition, and so it is expected as a mode capable of inexpensively implementing a high-resolution liquid crystal display apparatus having no problem of electrode pattern alignment between the upper and lower substrates.

As for a challenge in an early development stage of the in-plane switching mode, there is improvement in the image quality degradation due to the crosstalk from a row line for applying a signal voltage based on image data. It occurs, when the row line and a pixel electrode are closely positioned, because variation of the signal voltage is overlapd at a certain ratio on a pixel potential as a crosstalk voltage due to a coupling capacitance between the line and the electrode. In order to prevent it, a configuration for using a second pixel electrode also as a screening electrode was devised, and is disclosed in JP-A-6-202127 specification.

Another challenge of the in-plane switching mode is that, as a liquid crystal is driven by a horizontal electric field, the driving voltage is apt to rise when an inter-electrode distance is widened to increase an opening ratio. If the liquid crystal driving voltage becomes high, it is necessary to enhance dielectric strength of a driving element placed around the liquid crystal panel for the sake of applying a voltage to the liquid crystal, and it is also necessary, in the case where the driving element is comprised of active elements such as thin film transistors formed by polysilicon or amorphous silicon of a low temperature process on a glass substrate, to enhance the dielectric strength of the thin film transistors. In addition, the dielectric strength required for the active elements in the pixel portion also becomes high. Due to enhancement of the dielectric strength of the active elements, there is a danger of damaging some of the characteristics of the liquid crystal display apparatus such as limitation of higher resolution due to increased area and increase in non-display area of the driving element, increase in the process of enhancing the dielectric strength of the thin film transistors, and increase in glass periphery area.

The authors hereof devised a differential driving mode, as the configuration capable of applying a sufficient voltage to the liquid crystal and also reducing the voltage of the dielectric strength of the driving element even with a decreased number of lines, wherein a plurality of TFTs are placed in one pixel and the liquid crystal is driven by a differential of the voltages written by these TFTs to display an image, which mode was disclosed in JP-A-6-148596 and JP-A-6-202073 specifications.

In order to more clarify an object of the present invention, a basic configuration common among all the active matrix type liquid crystal display modes and a driving mode thereof will be described first, and then the object of an active matrix type liquid crystal display apparatus will be described by taking the in-plane switching mode as an example.

FIG. 22 shows an equivalent circuit diagram of the active matrix type liquid crystal display apparatus. At a start of a selected period, the potential for rendering an active element 203 on is given to a row line 201 by a gate driver 106, the potential based on image data is given to a row line 202 by a gate driver 107, and the potential based on the image data is given to a pixel electrode 210 via the active element 203. A liquid crystal 208 and a holding capacitance 205 connected in parallel are charged by a potential difference between the potential of the pixel electrode 210 and that of a common line 209 to a second pixel electrode 204 and the holding capacitance 205 of the liquid crystal. In the cases of having on the opposite substrate side a second pixel electrode which is plane and common among all the pixels as in the TN mode, the MVA mode or the OCB mode, the second pixel electrode 204 is normally formed on the opposite substrate side and the common line 209 of the holding capacitance 205 is formed on the same substrate as the active element as shown in this drawing. On the other hand, in the configuration such as the in-plane switching mode capable of forming the pixel electrode 210 and the second pixel electrode 204 on the same substrate, it is possible to connect the common line 209 to the second pixel electrode 204. At the end of the selected period, the potential for rendering the active element 203 off is given to the row line 201, so that the writing is completed. Charging of the liquid crystal 208 and the holding capacitance 205 is finished in a very short time compared with an optical response of the liquid crystal. At this time, transmittance shown by the liquid crystal 208 corresponds to an absolute value of the voltage which is written and is not dependent on polarity of the voltage.

The crosstalk in the active matrix type liquid crystal display apparatus in the in-plane switching mode will be described by referring to FIG. 21.

FIG. 21 shows an equivalent circuit of the active matrix type in-plane switching mode, and FIG. 23 shows a plane layout diagram thereof. The overall configuration as the liquid crystal display apparatus is omitted since it is the same as FIG. 22. This drawing is the equivalent circuit diagram and at the same time, it shows a placement which is almost plane, where the second pixel electrode 204 is normally connected to the common line 209 of a constant potential so that the second pixel electrode 204 acts as an electrical shield against voltage variation of Vd1 and Vd2 of the row line 202 so as to stabilize the potential of the pixel electrode 210. Accordingly, it is possible, by taking sufficient width of the second pixel electrode 204, to be hardly influenced by potential variation of the row line 202 so as to display a high-quality image without crosstalk. However, if the width of the second pixel electrode 204 is rendered smaller for the purpose of increasing the opening ratio or in the case of small pixel area due to high resolution, the voltage variation of the row line 202 to which the voltage based on the image data is applied is transferred via capacitance coupling of a parasitic capacitance 631, so that crosstalk voltage is overlapd on the pixel electrode 210. In this case, there are the cases where, in the in-plane switching mode that is a normally black mode, contrast reduction due to rise in black display luminance, the crosstalk in a row direction in half-tone display, or a flicker or an afterimage due to superimposition of asymmetrical voltage by the polarity may be observed.

Of such image quality degradation, a curbing method by a driving mode has been adopted as to the flicker and the crosstalk in a row direction in half-tone display. Here, the flicker, the polarity of the voltage to be given to the liquid crystal and the method of curbing the flicker will be described. It is generally known that the liquid crystal has its characteristics degraded by applying DC voltage thereto, and so the image data given to the liquid crystal of certain pixels is normally applied by reversing its polarity at least for each frame. While the transmittance shown by the liquid crystal is determined by the size of the applied voltage and is not dependent on polarity thereof, the crosstalk is generated, if driven by using the active element, due to the parasitic capacitance which the active element has or a leakage current when the active element is off so that, even if the voltage is supplied from a data driver so as to apply the voltage of the same size to the first pixel electrode 210, there is a slight deviation to a voltage value actually applied to the liquid crystal depending on its polarity. Normally, the liquid crystal display apparatus displays one frame at 60 Hz. If the voltages applied to the liquid crystal at the positive and negative polarities are equal, human eyes cannot observe it as the flicker since it is an AC drive of 60 Hz, whereas the same image data is recognized as the flicker of a 30 Hz component if the luminance is different between the positive and negative polarities. As for a method of curbing the flicker, it becomes impossible, by increasing a frame frequency and displaying it at 120 Hz for instance, to recognize the flicker due to the difference in the luminance between the positive and negative polarities since it exceeds the frequency discriminable by the human eyes. As for another method of curbing the flicker, it is also possible, by spatially distributing the pixels to be written at the positive polarity and those to be written at the negative polarity, to render the difference in the luminance average so as not to have it recognized by the human eyes.

In the past, the method of spatially distributing the writing polarities was exclusively used, especially for a large liquid crystal display apparatus, in order to avoid limitation of driving ability of a gate driver and the data driver. The following four methods of driving the active matrix type liquid crystal display apparatus, including a method of not spatially distributing, are known.

(1) Frame inversion driving: It is the driving mode of reversing the polarities for each frame without spatially distributing the polarities of the applied voltage, which is the easiest way to observe the flicker.

(2) Per-line inversion driving: It is the driving mode of reversing the polarities of the applied voltage for each line, and further reversing the polarities for each frame.

(3) Per-row inversion driving: It is the driving mode of reversing the polarities of the applied voltage for each row, and further reversing the polarities for each frame.

(4) Dot inversion driving: It is the driving mode of reversing the polarities of the applied voltage both for each line and for each row, and further reversing the polarities for each frame, which is the best way to curb the flicker.

As the frame inversion driving writes the image data of the same polarity on the entire screen, it has an advantage that the potential to be outputted in a certain frame by the data driver can always have the same polarity as the second pixel electrode and it can be combined with a common AC driving mode for varying the potential of the second pixel electrode according to the writing polarity so as to use the data driver of low pressure-resistance. However, in the case where the polarity of a displayed image to be visualized is reversed for each frame at the frame frequency of 60 Hz in the past pixel configuration, the flicker can be easily recognized due to the aforementioned difference in the writing characteristics of the positive and negative polarities.

The per-line inversion driving and the per-row inversion driving distribute the polarities of the displayed image in the screen, and display it by rendering the difference in the luminance due to the different polarities average to the human eyes so that the flicker cannot be recognized.

The dot inversion driving is a driving mode whereby, as it reverses the polarities of the displayed image for each line and further for each row, the difference in the luminance due to the different polarities is further rendered average so as to prevent the flicker from being recognized.

Of the above four types of driving mode, the per-line inversion driving mode and the dot inversion driving mode have the writing polarity changed for each line, and so the average of the voltages applied on the row line, not by the image, is almost constant so that they are capable of significantly curbing the crosstalk voltage applied to the pixel electrode from the row line via the parasitic capacitance. However, they are not all-round driving modes since there is a display pattern for canceling the effects of these driving modes, such as the pattern of repeating every other line. Furthermore, the per-line inversion driving mode and the dot inversion driving mode have a number of constraints to various low-voltage driving modes. For instance, a common line configuration capable of combination with the dot inversion driving mode in the low-voltage driving mode for rendering the common line as AC has not been implemented. In addition, it is considered that there is a constraint to a resistance value in the low-voltage driving in the per-line inversion driving mode and so the high image quality can hardly be obtained with higher resolution and on a larger screen.

Next, the differential driving mode will be described by referring to FIG. 20. To briefly describe this pixel configuration and the driving mode, two active elements are provided to one pixel, and the voltage is applied to the liquid crystal by the difference voltage between the potential of the adjacent row line and the row line of the pixel to which the signal voltage based on the image data is applied, where it is possible, as a characteristic of this mode, to implement a high opening ratio since there is no need to provide the common line specific thereto. FIG. 20 shows the pixel configuration of the method of writing the voltage to the liquid crystal by the potential difference between the row lines on both sides sandwiching the pixel electrode. While any low-voltage driving including the dot inversion driving is possible by this method since the potential difference between the adjacent row lines is arbitrarily made, the potential difference between the adjacent lines is gradually overlapd so that the driving element of high dielectric strength becomes necessary or a complicated row line potential must be set.

SUMMARY OF THE INVENTION

An object of the present invention in consideration of the above is to implement low-voltage driving for a number of driving modes mentioned above with a high image quality that is crosstalk-free.

Another object of the present invention is to provide a bright liquid crystal display apparatus which has a small number of lines and a high opening ratio.

According to an embodiment of the present invention, the liquid crystal display apparatus has a pair of substrates of which at least one is transparent and a liquid crystal layer supported between the pair of substrates, wherein one of the pair has a plurality of row lines, a plurality of row lines placed intersecting the plurality of row lines and a plurality of common lines, and a first active element is provided near the intersection of the plurality of row lines and the plurality of row lines, and a voltage according to image data is written to pixels placed like a matrix through the first active element, and the above described apparatus has a second active element, a first pixel electrode and a second pixel electrode provided in the pixel, and has one terminal of the first active element connected to the first pixel electrode, the other terminal to the row line, one terminal of the second active element to the second pixel electrode, the other terminal to the common line or the row line not involved in writing of the pixel electrode, and besides, the first and second active elements are brought into conduction during a period of writing the voltage to a liquid crystal, and the first and second active elements are brought into a high resistance state during a holding period, and in addition, a capacitance between the row line and the first pixel electrode and that between the row line and the second pixel electrode are equal as to each row line adjacent to the pixel.

According to another embodiment of the present invention, the liquid crystal display apparatus has the pair of substrates of which at least one is transparent and the liquid crystal layer supported between the pair of substrates, wherein one of the pair has the plurality of row lines, the plurality of row lines placed intersecting the plurality of row lines and the plurality of common lines, and the first active element is provided near the intersection of the plurality of row lines and the plurality of row lines, and the voltage according to the image data is written to the pixels placed like a matrix through the first active element, and the above described apparatus has the second active element, the first pixel electrode and the second pixel electrode provided in the pixel, and has one terminal of the first active element connected to the first pixel electrode, the other terminal to the row line, one terminal of the second active element to the second pixel electrode, the other terminal to the common line, and besides, the first and second active elements are brought into conduction during the period of writing the voltage to the liquid crystal, and the first and second active elements are brought into the high resistance state during the holding period, and in addition, a superimposing portion via a dielectric film of the first pixel electrode and the second pixel electrode is provided around the center in the row direction of the pixels, and moreover, the first pixel electrode and the second pixel electrode are formed to be in an axisymmetric relation in the row direction centering on the superimposing portion.

Moreover, in these embodiments, a holding capacitance is formed in the superimposing portion of the first and second pixel electrodes.

Furthermore, the common line is placed almost in parallel with the row line, and a projection-like shielding electrode is provided in part of the common line, so that the shielding electrode sandwiches the row line or is positioned between the row line and the first and second pixel electrodes or placed to cover the row line. A further improvement in the image quality due to this configuration can be expected.

According to a further embodiment of the present invention, the liquid crystal display apparatus has the pair of substrates of which at least one is transparent and the liquid crystal layer supported between the pair of substrates, wherein one of the pair has a plurality of row lines and a plurality of row lines, and the pixels are placed corresponding to intersections of the plurality of row lines and the plurality of row lines, and the above described apparatus has the first pixel electrode and the second pixel electrode provided in the pixel, and has the first active element placed in the pixel and has the output terminal thereof connected to one row line adjacent to the first pixel electrode and pixel, and has the second active element placed in the pixel and has its output connected to the other row line adjacent to the second pixel electrode, and besides, the first and second active elements are brought into conduction during the period of writing the voltage to the liquid crystal, and the first and second active elements are brought into a high resistance state during the holding period, and the difference voltage between the adjacent row lines is applied to the liquid crystal to display the image, and in addition, the capacitance between the row line and the first pixel electrode and that between the row line and the second pixel electrode are equal as to each row line adjacent to the pixel.

As for the form of the pixels, for the sake of the most effective workings, the superimposing portion via the dielectric film of the first pixel electrode and the second pixel electrode is provided around the center in the row direction of the pixels, and the holding capacitance is formed in the superimposing portion, so that the first pixel electrode and the second pixel electrode are formed to be in the axisymmetric relation in the row direction centering on the superimposing portion.

As for the driving mode, in order to achieve it, the pixels comprising one line are divided into two pixel groups, and two row lines are provided to one line so that each row line controls the writing of a predetermined pixel group.

In addition, in order to achieve it, the first and second active elements are comprised of two types of active elements P and N, and each pixel is comprised of the active elements of the same type so that the type of the active element to be connected to each row line is different in each adjacent pixel.

Moreover, as for the driving mode for improving the image quality, it can be implemented by rendering an average of the voltages written to the first and second pixel electrodes comprising the pixel constantly fixed.

Other objects, features and advantages of the invention will become apparent from the following description of the embodiments of the invention taken in conjunction with the accompanying drawings.

DESCRIPTION OF THE EMBODIMENTS

Hereafter, the embodiments of the present invention will be concretely described by using the drawings.

(Embodiment 1)

Figure 1:
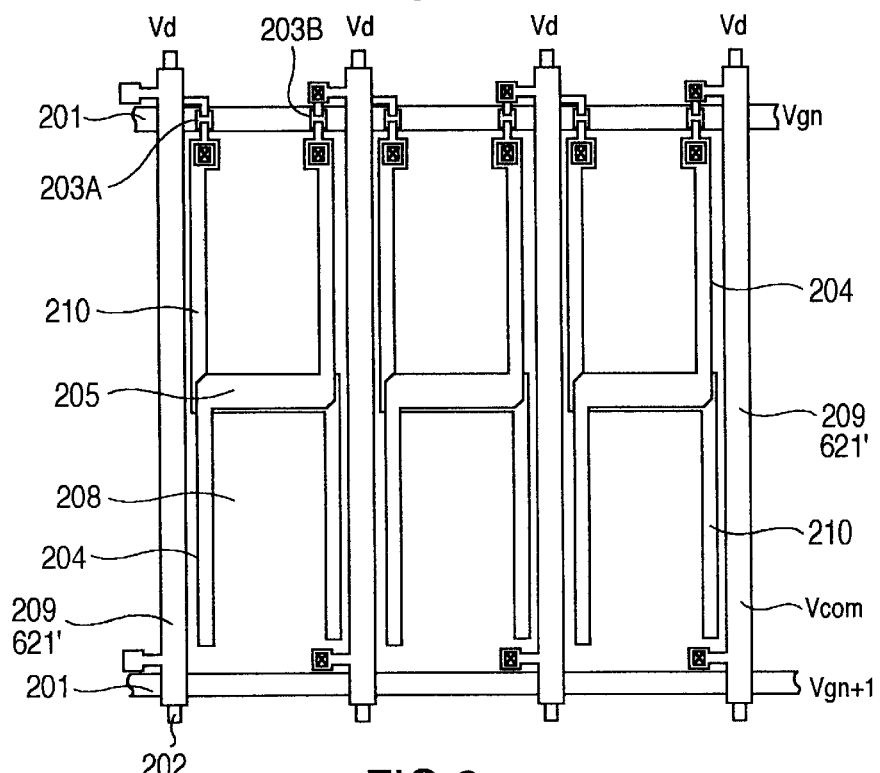
FIG. 1 is a pixel layout plan in an embodiment 1 of the present invention.
Figure 2:
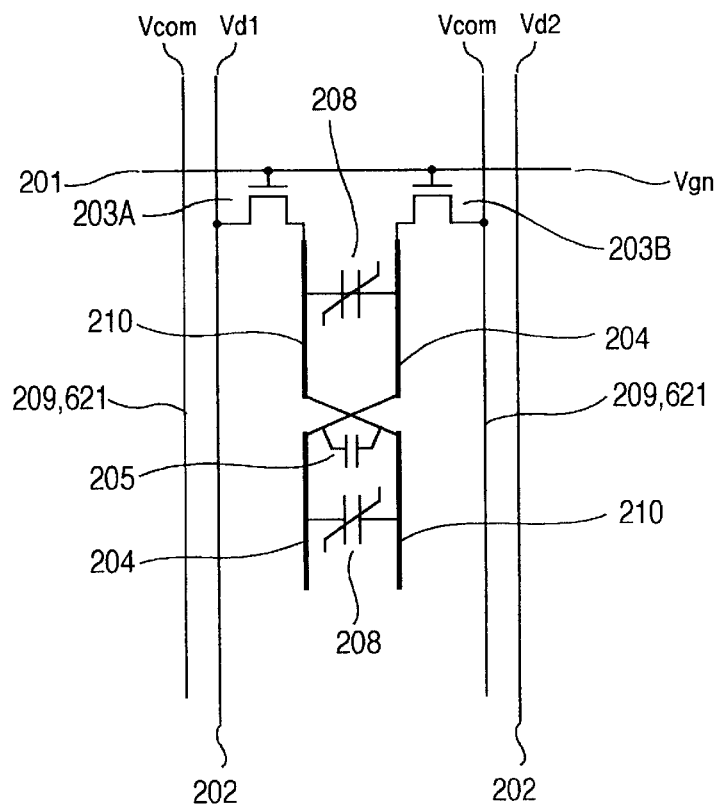
FIG. 2 is an equivalent circuit diagram showing effects in the embodiment 1 of the present invention.
Figure 3:
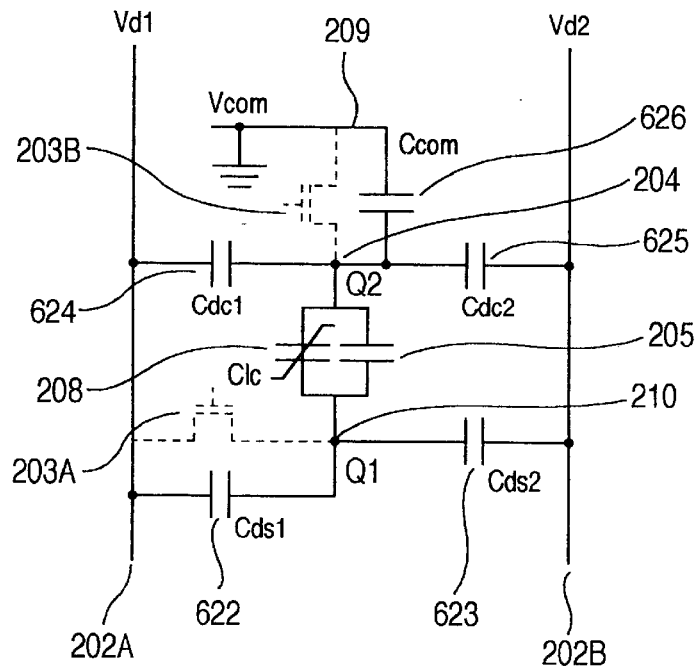
FIG. 3 is an equivalent circuit diagram showing the effects in the embodiment 1 of the present invention.
Figure 16:
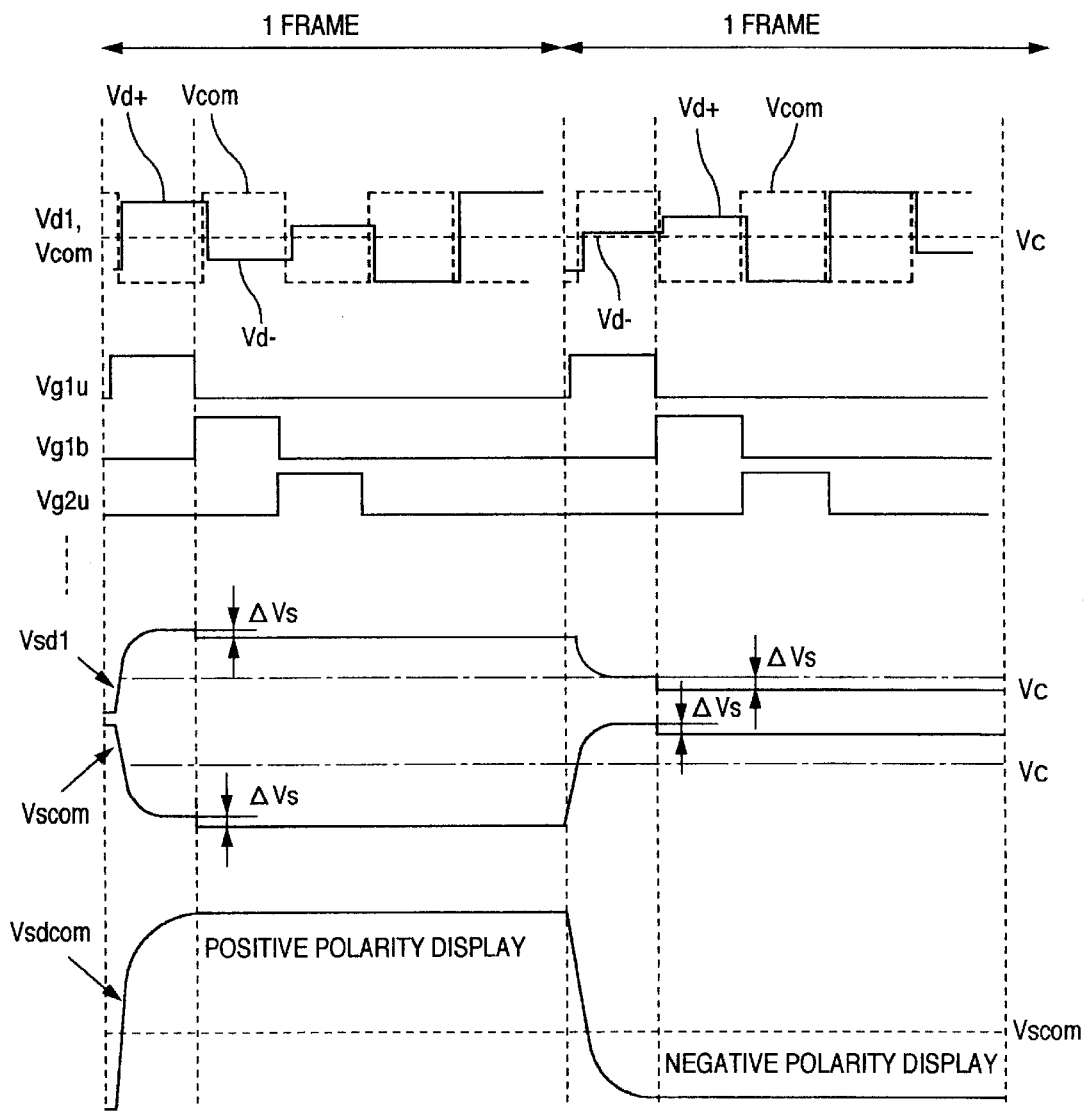
FIG. 16 is a driving sequence of the liquid crystal display apparatus in the embodiment 1 of the present invention.
Figure 24A:
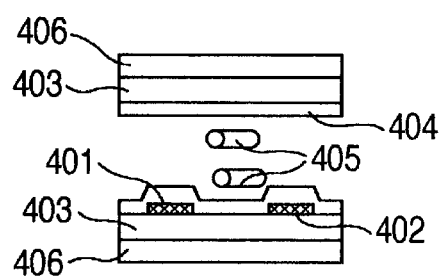
FIGS. 24A, 24B, 24C and 24D are diagrams showing liquid crystal operation of the liquid crystal display apparatus in the in-plane switching mode.
Figure 24B:
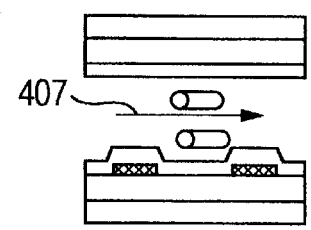
Figure 24C:
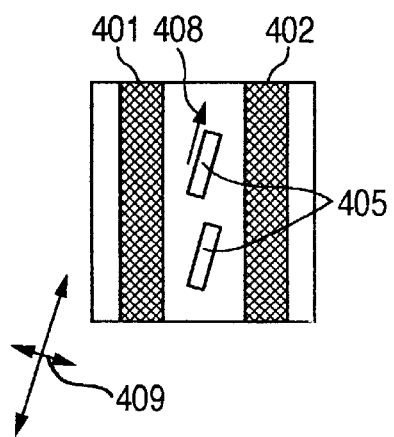
Figure 24D:
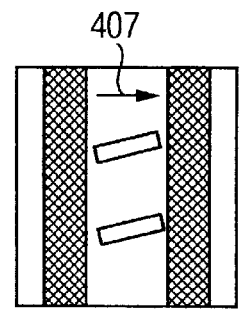
Figure 25:
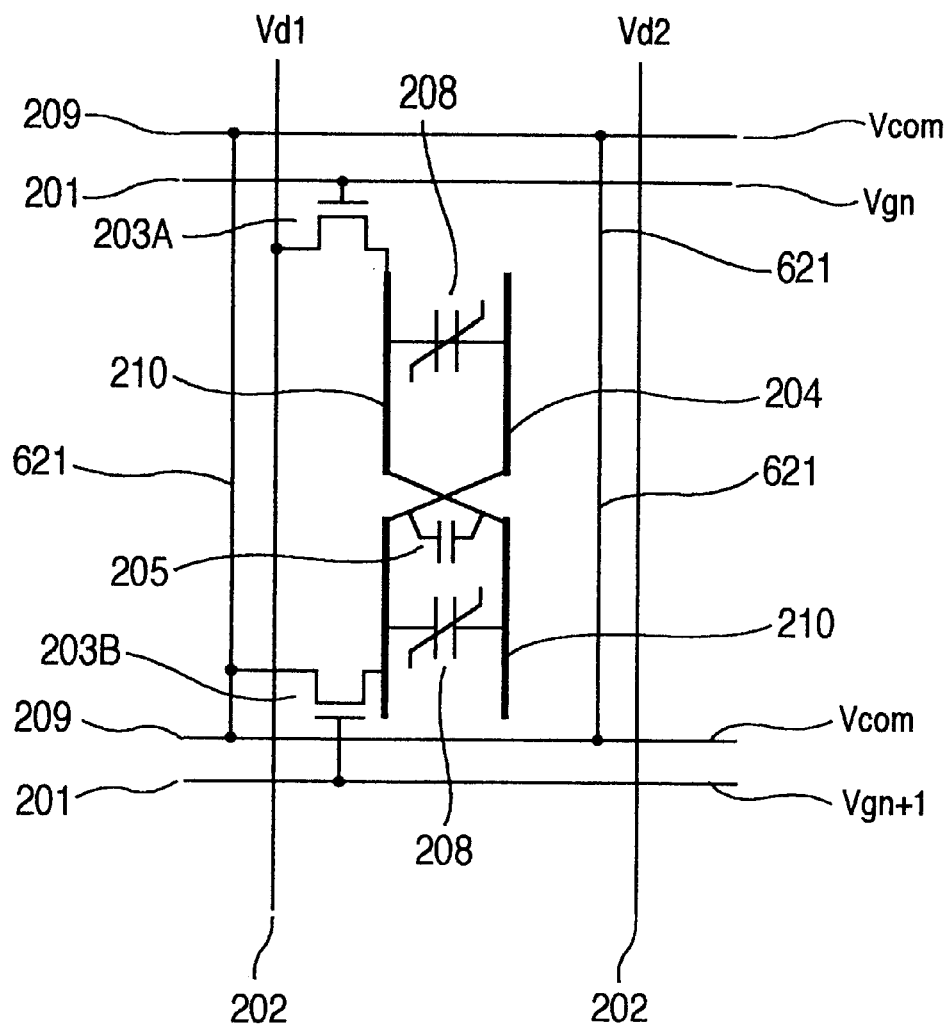
FIG. 25 is an equivalent circuit diagram of the liquid crystal display apparatus in the embodiment 1 of the present invention.

A first embodiment of the present invention will be described by using FIGS. 1 to 9, FIG. 16, FIGS. 24 and 25. This embodiment is an example of applying it to an in-plane switching mode that is a normally black mode, which provides a liquid crystal display apparatus for curbing occurrence of crosstalk such as a vertical smear, and it is applicable to a display mode capable of providing a common line and a second pixel electrode on the same substrate and also to the display mode for providing the common line and the second pixel electrode on an opposite substrate and yet having a circuit capable of individually controlling the common line on the opposite substrate. FIG. 1 is a pixel layout plan of three pixels in an embodiment 1 of the present invention, FIG. 2 is an equivalent circuit diagram of the pixels shown in FIG. 1, FIG. 3 is the detailed equivalent circuit diagram of the pixels including a parasitic capacitance in a holding state, FIGS. 4 to 6 and FIGS. 8 and 9 are the pixel layout plans showing other configurations of the present invention, FIGS. 7 and 25 are the equivalent circuit diagrams showing other configurations of the present invention, and FIG. 16 shows a driving sequence of this embodiment and FIG. 24 shows a principle diagram of the in-plane switching mode.

This embodiment is an example of applying a driving mode of the present invention to the in-plane switching mode that is a normally black mode wherein it becomes a black display when no voltage is applied, to be more specific, when a voltage below a threshold is applied. While this embodiment is described by taking the in-plane switching mode as an example, it is widely applicable to any liquid crystal display apparatus in a TN mode or an MVA mode or of a projection type as far as it has a configuration wherein a pair of electrodes for giving the potential to the liquid crystal are independent for each pixel in a holding state and is in a high resistance state.

First, the in-plane switching mode will be described. FIGS. 24A and 24B represent side sectional views showing liquid crystal operation inside a panel of an in-plane switching mode liquid crystal, and FIGS. 24C and 24D represent front views thereof. Active elements are omitted in FIGS. 24A, 24B, 24C and 24D. In addition, while a plurality of pixels are formed by constituting a stripe-like electrode in an explanatory drawing, a portion of one pixel is shown here. A cell side section when applying no voltage is shown in FIG. 24A, and the front view at that time is shown in FIG. 24C. Linear electrodes 401 and 402 are formed inside a pair of transparent substrates 403, and an orientation controlling film 404 is applied and orientated thereon. A liquid crystal composition is supported between the pair of transparent substrates 403. A rodlike liquid crystal element 405 is orientated, when no voltage is applied to an electric field, to have some angle to the direction of the length of the stripe-like electrode, that is, 45 degrees≦|angle of liquid crystal element major axis (optical axis) near interface to the electric field direction|<90 degrees. The liquid crystal element orientations on the upper and lower interfaces will be described here by taking an example of parallel. In addition, dielectric anisotropy of the liquid crystal element is assumed to be positive. Next, if the voltage is applied to an electric field 407, the liquid crystal element changes its orientation as shown in FIGS. 24B and D. It becomes possible, by placing a transmission axis of a polarizing plate 406 at a predetermined angle 409, to change optical transmittance by application to the electric field. Thus, it is possible, according to the present invention, to perform a display giving a contrast ratio of transmitted light even if there is no transparent electrode.

As a concrete configuration for giving the contrast ratio, there are a mode utilizing a state where the liquid crystal element orientations on the upper and lower substrates are almost parallel (referred to as a birefringence mode here because it utilizes interference color due to a birefringence phase difference) and a mode utilizing a state where the liquid crystal element orientations on the upper and lower substrates are intersecting and element arrangement in the cell is distorted (referred to as an optical rotary power mode here because it utilizes the optical rotary power for rotating a plane of polarization in the liquid crystal composition layer). In the birefringence mode, while the element major axis (optical axis) direction remains almost parallel with a substrate interface, its bearing is changed in the interface due to voltage application, and the angle made with the axis of the polarizing plate set at a predetermined angle is changed so as to change the optical transmittance. While the optical rotary power mode also changes only the bearing in the element major axis direction by the voltage application likewise, in this case, it makes use of the change in the optical rotary power due to an untied spiral. In addition, the major axis of the liquid crystal element is always almost parallel with the substrate in the display mode of the present invention, and it does not erect so that change in brightness on changing a visual direction is small, resulting in no visual dependency and a remarkable improvement in visual characteristics. This display mode does not obtain a dark state by rendering the birefringence phase difference almost zero by the voltage application as the one in the past but it changes the angle made by the liquid crystal element major axis and the axis (absorption or transmission axis) of the polarizing plate, and thus it is fundamentally different therefrom. In case of vertically erecting the liquid crystal element major axis on the substrate interface as with the TN type in the past, the visual direction for rendering the birefringence phase difference zero is only frontward, that is, the direction vertical to the substrate interface, and so the birefringence phase difference appears if it is even slightly inclined. A normally open type has light leaked, causing reduction in a contrast ratio and inversion of a gradation level.

The method of creating the in-plane switching mode liquid crystal used in this embodiment will be described. As for the substrates, two glass substrates of 0.7 -mm thickness with polished surfaces are used. A nematic liquid crystal composition of which dielectric constant anisotropy $\Delta\epsilon$ is positive with a value of 4.5 and birefringence $\Delta n$ is 0.072 (589 nm, 20 degrees C.) is put between these substrates. While the liquid crystal of which dielectric constant anisotropy $\Delta\epsilon$ is positive is used here, a negative liquid crystal may also be used. A polyimide orientation controlling film applied on the substrate surface undergoes a rubbing process to make a pre-tilt angle of 3.5 degrees. While an orientation process by rubbing is used, it is possible to orientate it with polarizing ultraviolet light by using an optically reactive orientation film, in which case the display which is further even and of a higher contrast ratio can be obtained. The rubbing directions on the upper and lower interfaces are mutually almost parallel, and the angle made with an applied field direction is 85 degrees. The gap between the upper and lower substrates is supported by distributing spherical polymer-beads between them to be 4.5 $\mu$m in a liquid crystal filled state. Accordingly, $\Delta n \cdot d$ is 0.324 $\mu$m. As for the combination of the liquid-crystal material and the gap between the upper and lower substrates, it is not limited to the combination in this embodiment but there are some alternatives available. For instance, as for the combination for rendering $\Delta n \cdot d$ almost the same, it is also possible, by selecting a material having birefringence $\Delta n$ which is larger, to render the gap smaller so as to increase speed of response. In addition, the alternative to render the value of $\Delta n \cdot d$ itself smaller and curb the change in color against the voltage applied to the liquid crystal is possible. The panel is sandwiched by the two polarizing plates, where a polarizing transmission axis of one of the polarizing plates is almost parallel (85 degrees) in the rubbing direction, and the other is orthogonal (−5 degrees) thereto. Thereby, a normally close characteristic can be obtained. While the applied field direction is one direction in the pixel in this embodiment, it is possible, by dividing the inside of the pixel and providing a plurality of applied field directions, to further improve the viewing angle characteristic, where for instance, it is effective to divide it in the shape of a symbol <.

The pixel configuration in this embodiment and its workings will be described by taking FIGS. 1 to 3 as examples.

While the basic configuration is the same as the liquid crystal display apparatus in the in-plane switching mode shown in FIG. 24, each pixel is comprised of two active elements 203A and 203B, where a drain terminal of the first active element 203A is connected to the output of the data driver by way of a row line 202 as in the past, a source terminal is connected to a first pixel electrode 210, the drain terminal of the second active element 203B is connected to a common line 209 and the source terminal of the second active element 203B is connected to a second pixel electrode 204, and a superimposing portion via a dielectric film of the first pixel electrode 210 and the second pixel electrode 204 is provided around the center in the row direction of the pixels, a holding capacitance 205 is formed in the superimposing portion via the dielectric film, and moreover, the first pixel electrode 210 and the second pixel electrode 204 are formed to be in an axisymmetric relation in the row direction centering on the superimposing portion.

In FIG. 1, light irradiated by an illumination apparatus not shown has its transmittance controlled by an electro-optical characteristic of the liquid crystal filled between the first pixel electrode 210 and the second pixel electrode 204 for applying the voltage to the liquid crystal and the polarizing plate placed in a cross-nicol relationship not shown, so that it is visualized as an image by the entire liquid crystal display apparatus. At this time, the liquid crystal acts as a capacitance element 208 between the first pixel electrode 210 and the second pixel electrode 204, and the electro-optical characteristic, that is, the transmittance changes due to influence of electrostatic force from the outside. Here, the common line 209 electrically shields electrostatic noise (usually referred to as electrical crosstalk or merely crosstalk) to the liquid crystal due to voltage variation of the row line 202 for conveying voltage output of the data driver to the active element of each pixel by the common line having almost fixed potential not dependent on the displayed image, and it also acts as a shielding electrode 621. While it is preferable that this shielding electrode 621 almost completely covers row electrodes as shown in FIG. 1 in terms of improvements in shielding performance and an opening ratio, it is possible, in the case where it cannot be rendered multilayer due to process constraints, to obtain the same effects by placing it between the row line 202 and the pixel electrode 210.

While it is possible, in the case where the shielding electrode 621 is a completely fixed potential, to significantly curb occurrence of the crosstalk, it requires further improvements in order to further enhance the image quality even when the potential of the shielding electrode 621 is fixed or in the case where a potential difference not due to the voltage written to the first and second pixel electrodes occurs to a pixel portion in order to implement low-voltage driving for causing adjacent shielding electrodes to have the potential difference and thereby reducing the voltage of the entire liquid crystal display apparatus and in the case where it is intended to eliminate the shielding electrodes to significantly improve the opening ratio. Therefore, the crosstalk will be analyzed quantitatively and in detail. FIG. 3 is a detailed equivalent circuit diagram including the parasitic capacitance of one pixel. In this drawing, the crosstalk from the two row lines 202A and 202B occurs in the holding state, that is, when the two active elements 203A and 203B are in the high resistance state. At this time, the two active elements 203A and 203B act as the high resistance state, and so they are shown by dashed lines for reference purposes. The crosstalk by data driver outputs Vd1 and Vd2 of the two row lines 202A and 202B will be analyzed. The liquid crystal capacitance 208 and the holding capacitance 205 are representatively referred to as a pixel capacitance Clc. The pixel electrode 210 and the second pixel electrode 204 which are the electrodes on both ends of the pixel capacitance Clc have the parasitic capacitance Cds1 and Cdc1 with the row line 202A related to Vd1 and the parasitic capacitance Cds2 and Cdc2 with the row line 202B related to Vd2 connected thereto respectively, and the parasitic capacitance Cccm626 of the second active element connected between a common line Vcom and the second pixel electrode 204. While the parasitic capacitance of the active element 203A also exists and has almost the same size as that of the active element 203B, it is considered as included in the parasitic capacitance Cds1 since it is usually small enough to be neglected compared to the parasitic capacitance Cds1 between the lines.

The voltage across each capacitance is determined as follows by using the potential of the common line as a reference potential. The voltage across the parasitic capacitance 626 of the second active element 203B is Vccm, the voltage across line/electrode parasitic capacitance 624 is Vdc2, and likewise hereafter, the voltage across a parasitic capacitance 625 is Vdc2, the voltage across a parasitic capacitance 622 is Vds1, the voltage across a parasitic capacitance 623 is Vdc1, and the voltage across the liquid crystal capacities 208 and 205 is Vlc. In this case, it is as follows at the time of considering the potential and the pixel electrode potential of the second pixel electrode 204.

$$Vccm = Vd1 + Vdc2 = Vd2 + Vdc2 \quad (1)$$

$$Vccm + Vlc = Vd1 + Vds1 = Vd2 + Vds2 \quad (2)$$

In addition, it is as follows when electric charges charged to the first pixel electrode 210 and the second pixel electrode 204 by the active elements 203A and 203B are Q1 and Q2 respectively.

$$Q1 = Cds1 \times Vds1 + Cds2 \times Vds2 + Clc \times Vlc \quad (3)$$

$$Q2 = Cdc1 \times Vdc1 + Cdc2 \times Vdc2 + Cccm \times Vccm - Clc \times Vlc \quad (4)$$

When the voltage variations of the row lines are $\Delta Vd1$ and $\Delta Vd2$ respectively, variation amounts $\Delta Q1$ and $\Delta Q2$ of the electric charges at each electrode can be acquired by equations (1) to (4) as follows.

$$\Delta Q1 = -Cds1 \times \Delta Vd1 - Cds2 \times \Delta Vd2 + (Cds1 + Cds2 + Clc) \times \Delta Vlc + (Cds1 + Cds2) \times \Delta Vccm \quad (5)$$

$$\Delta Q2 = -Cdc1 \times \Delta Vd1 - Cdc2 \times \Delta Vd2 - Clc \times \Delta Vlc + Cccm \times \Delta Vccm \quad (6)$$

Here, as it is $\Delta Q1 = \Delta Q2 = 0$ according to the principle of conservation of charge, a variation amount $\Delta Vlc$ of the voltage across the pixel capacitance can be acquired by equations (5) and (6) as follows.

$$\Delta Vlc = \frac{1}{2 \times Clc + Cds1 + Cds2}((Cds1 - Cdc1) \times \Delta Vd1 + \quad (7)$$
$$(Cds2 - Cdc2) \times \Delta Vd2 + (Cccm - Cds1 - Cds2) \times \Delta Vccm)$$

Here, as it is $\Delta Vlc = 0$, the change in the voltage across the pixel capacitance can be eliminated as follows.

$$\Delta Vccm = \frac{1}{Ccm - Cds1 - Cds2} \quad (8)$$
$$((Cds1 - Cdc1) \times \Delta Vd1 + (Cds2 - Cdc2) \times \Delta Vd2)$$

The following is the condition for equation (8) to hold.

$$Cds1 = Cdc1 \text{ and } Cds2 = Cdc2 \quad (9)$$

Structurally, it is accomplished by rendering the capacitance between the right and left row lines adjacent to each pixel and the first pixel electrode and that between each row line and the second pixel electrode equal. As there is no absolute constraint as to the configuration for rendering the two parasitic capacities for each row line equal, it is possible to render them equal by adding a supplementary capacitance to a desired electrode configuration, and yet the form that is the easiest and tolerant of manufacturing process variations is accomplished by rendering the distances between the row line and the first and second pixel electrodes equal and also rendering the length of the line opposite the row line, that is, an opposite length equal. An example thereof is the pixel configuration shown in FIG. 1. Besides, the method of designing the parasitic capacitance of equation (9) to be equal by capacitance calculation is also effective.

FIG. 16 shows a driving sequence of this embodiment.

As this embodiment uses a per-line inversion driving for reversing the polarity of the voltage written to the pixel for each line, the voltage Vcom of the common line 209 is rendered alternating for each line. As for other driving modes in this embodiment, a dot inversion driving mode for rendering the voltage Vcom of the common line 209 constantly fixed, a per-row inversion driving, a per-line inversion driving, or a frame inversion driving for rendering the voltage Vcom of the common line alternating for each frame or low-voltage driving by per-row inversion driving is possible. Voltages Vsd1 and Vcom written to the respective pixel electrodes on the first line by the two active elements 203A and 203B are shown. As a gate selection pulse Vg1 is rendered high-level, a punch-through voltage $\Delta Vs$ is generated because the active element shifts from on to off due to the change of a gate selection pulse Vg1 from a high level to a low level after the voltages Vsd1 dependent on the image data and the voltage Vcom of the common line are written to the pixel electrodes 204 and 210. At this time, the parasitic capacitance, driving ability and so on of the two active elements placed in the pixel are rendered equal. As the punch-through voltages in the positive and negative writings by both active elements thereby become equal, no DC component is applied to the liquid crystal so that no flicker or afterimage is generated.

The cases of applying this embodiment to an animation display will be described. It is described in the Institute of Image Information Media Engineers Technical Report IDY2000-147 pp. 13–18 (2000-09) that a dynamic image becomes blurred on the liquid crystal display apparatus in the past. As the method of improving this blurriness of the dynamic image, a technology for rendering the illumination apparatus intermittently lighted up is described therein. It is described therein that the image quality of the dynamic image is influenced by the ratio of lighting up the illumination apparatus in one frame time (referred to as a lighting duty), and it is set forth that, in the case of displaying the dynamic image wherein the image moving at a normal speed is displayed by using a liquid crystal display of high-speed response, it is necessary to render the lighting duty a half or less (referred to as an allowance limit since it is a limit of withstanding the blurry of the dynamic image), and it reaches so-called a detection limit wherein the blurry of the animation is beyond human perception if the lighting duty is reduced to a quarter or so.

In order to display the image by intermittently lighting up the illumination apparatus, it is necessary to separate a scanning period for writing the image data to the pixel and a lighting period of the illumination apparatus. To be more specific, it is basic that the illumination apparatus is lighted up after completion of an optical response of the liquid crystal corresponding to the image data written by scanning. In addition, in case of displaying the dynamic image, the DC component is apt to be overlapd when the written data changes for each frame. To completely prevent it, in-frame AC driving for writing positive and negative voltages based on the same image data in the same frame is effective.

While the driving sequence for implementing this is not described in detail, it is necessary to display both positive and negative polarities for an equal period of time within one frame period, and it requires a preset writing for writing in black and high-speed writing that is four times faster than usual also considering synchronization with intermittent lighting of the illumination apparatus. This embodiment and many of the other embodiments according to the present invention are suited to the above high-speed driving since they have a configuration wherein a load of the line for supplying the voltage that determines the voltage to be written to the pixel is light. In addition, as they have the configuration wherein no crosstalk is generated for the voltage variation on the row line, they are capable of visualizing it by having the illumination apparatus lighted up even during voltage writing so that it is possible to implement a high-quality display with no crosstalk even in the bright animation display of high lighting duty.

Figure 4:
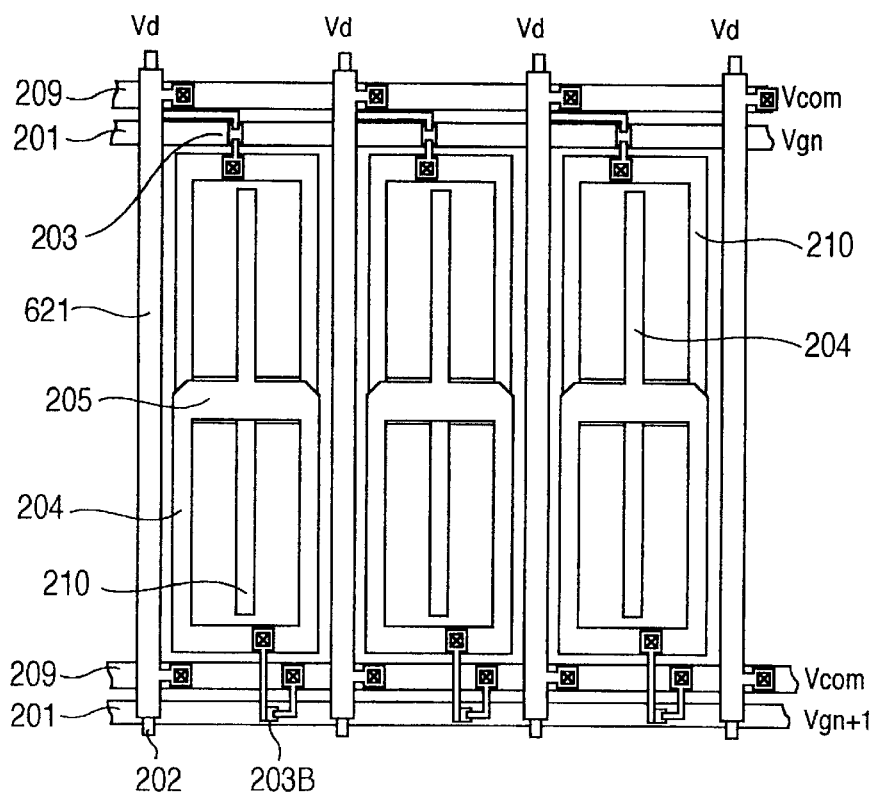
FIG. 4 is another pixel layout plan in the embodiment 1 of the present invention.
Figure 5:
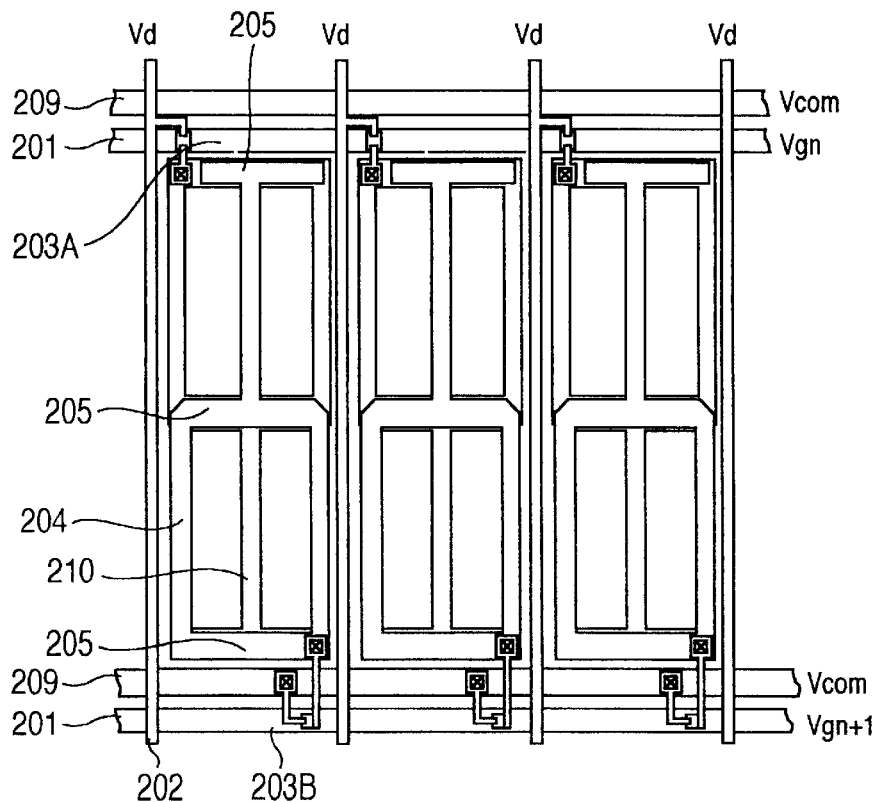
FIG. 5 is another pixel layout plan in the embodiment 1 of the present invention.

FIGS. 4 to 6, FIG. 8 and FIG. 9 show the other pixel configuration examples for implementing equation (9). FIG. 7 shows the equivalent circuit diagram for the pixel configuration shown in FIG. 6. FIG. 25 shows a pixel equivalent circuit diagram for the pixel configuration shown in FIGS. 4, 8 and 9. The equivalent circuit in FIG. 5 is omitted since it is the same as FIG. 25 except that there is no shielding electrode.

FIG. 4 has an overlapping portion of the pixel electrode and the second pixel electrode in the center of the pixel, and this overlapping portion is the holding capacitance 205. Furthermore, the two active elements 203A and 203B are also placed in the center in the line direction of the pixel so as to curb electrostatic crosstalk by row electrodes on both right and left sides to a minimum. Moreover, in order to curb voltage distortion of the common line when writing, each common line 209 is connected by the shielding electrode 621 in the row direction so as to have a mesh configuration. Thus, it becomes possible to distribute a charging current on the voltage writing to an adjacent common line or to a further distant common line so that the voltage variation on the writing is curbed and a higher-quality display is allowed.

While FIG. 5 has the same basic configuration as the embodiment in FIG. 4, it is characterized by being able to implement the display with no crosstalk even if the shielding electrode is omitted. It is possible, by omitting the shielding electrode, to enlarge the opening portion of the pixel determined by the area between the pixel electrode and the second pixel electrode so as to allow the bright display. In addition, it is possible to omit a step of forming the shielding electrode from the process, which allows manufacturing by a simplified process so that the configuration of excellent productivity can be implemented. As this embodiment has the configuration wherein the common line is independent on each line, it is also possible to set the potential of the common line to be different on each line so as to implement the low-voltage driving by the per-line inversion driving for rendering the potential of the common line alternating for each frame. In this case, it is possible, as the voltage of the common line on the writing is fixed, to implement the low-voltage driving of high image quality without any waveform distortion due to influence of a charging-time constant of the common line.

Figure 6:
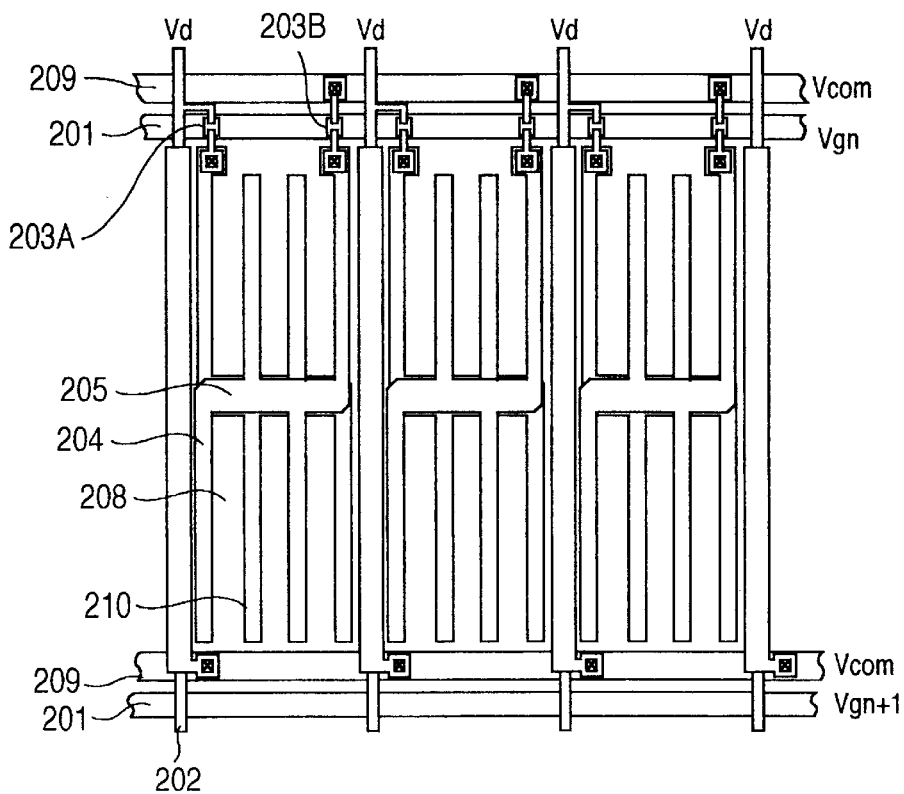
FIG. 6 is another pixel layout plan in the embodiment 1 of the present invention.
Figure 7:
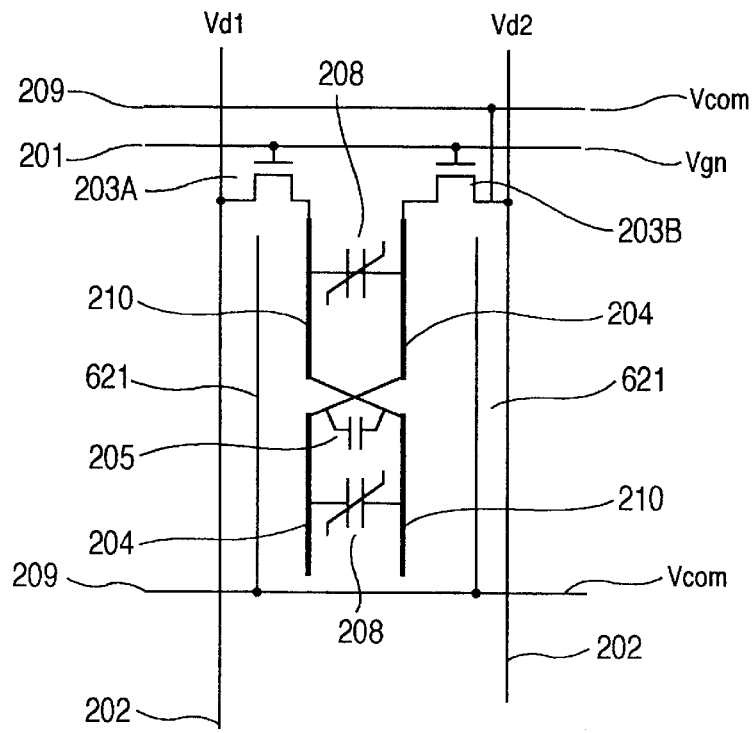
FIG. 7 is an equivalent circuit diagram showing the effects in the embodiment 1 of the present invention.

FIG. 6 shows the pixel horizontally divided into three in addition to being vertically divided into two. As is evident from the embodiments so far, it is possible, in the case where the number of horizontal divisions is odd, to have the configuration wherein the two active elements are controlled by the same row line so as to implement the pixel configuration of a high opening ratio with little waste of space as shown in this embodiment. However, it is also feasible to control them by another row line. While the shielding electrode 621 is connected to the common line 209 in this embodiment, it does not have to be the common line as far as it is the line having the potential almost fixed. For instance, the same shielding effect can be obtained when it is connected to any row line 201 which is vertically adjacent. This embodiment also has the same placement of the common lines as the embodiment in FIG. 5, and so it allows the low-voltage driving of high image quality to be implemented by the per-line inversion driving.

The above pixel configurations and the driving modes may be arbitrarily combined.

Figure 8:
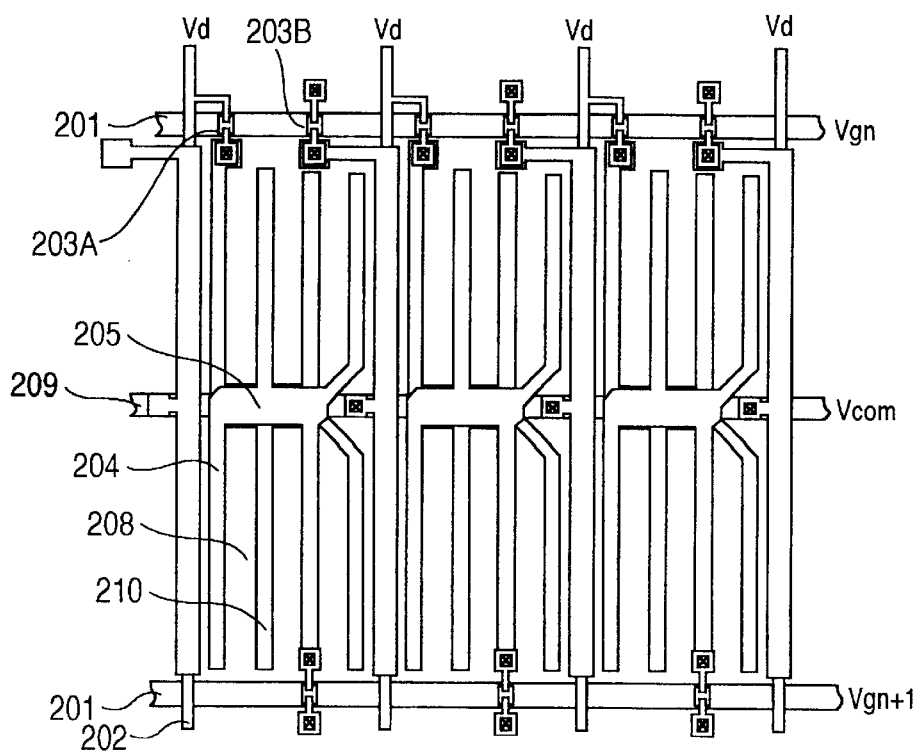
FIG. 8 is another pixel layout plan in the embodiment 1 of the present invention.

The embodiment in FIG. 8 has the common line 209 placed in the center of the pixel. In the case where the common line 209 and the row line 201 are formed in the same line step due to a process constraint, the distance between the two lines can be sufficiently secured, and so it is possible to significantly reduce failures due to a short in the case of having the common line 209 and the row line 201 in the same layer and also to render the common line 209 and the holding capacitance 205 as a multilayer configuration and allocate the area equivalent to the common line to the opening portion so as to implement a bright display apparatus of high opening ratio.

Figure 9:
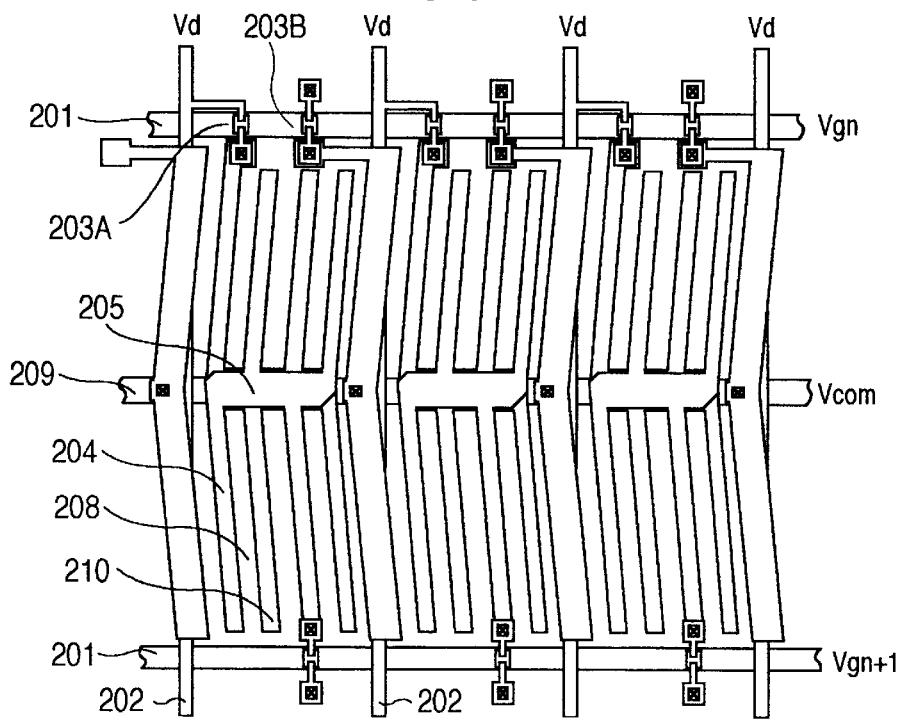
FIG. 9 is another pixel layout plan in the embodiment 1 of the present invention.

While the embodiment in FIG. 9 has the basic configuration and the equivalent circuit that are the same as the configuration in FIG. 8, it is characterized by changing the angle made by the pixel electrode and the row line to form the bend shape up and down the holding capacitance in the center. It is thereby possible to further improve a viewing angle characteristic of the in-plane switching mode. In this embodiment, as the orientation of the liquid crystal is parallel with the row line, the angled orientation performed to the glass substrate becomes parallel with one side of the substrate process-wise, so that setting of the angle, alignment accuracy of the polarizing plate and so on are improved, resulting in improvement in the characteristic such as peak contrast in particular.

In the case of writing the voltage to the pixel by a difference voltage, there is a merit of reducing withstand pressure of a transistor, which is not limited to this embodiment. In the low-voltage driving of the past, a common electrode is connected to the second pixel electrode directly and not via the active element, and therefore, if the low-voltage driving is performed by rendering the common electrode alternating, the voltage variation of the common electrode is overlapd on the pixel electrode, so that the withstand pressure equivalent to a maximum value of the sum of the voltage written to the pixel and an alternating voltage of the common electrode is necessary for each transistor. In the case of writing it by a difference voltage, however, the voltage applied to the transistor does not become higher than the maximum voltage on the writing, and so it is possible to keep the withstand pressure of the transistor low. It is thereby feasible to implement the improvement in the opening ratio, expansion of process alternatives and so on due to the reduction in size of the transistor.

According to the above-mentioned embodiment, the first and second active elements are brought into conduction during a period of writing the voltage to the liquid crystal and are brought into a high resistance state during the holding period, and a pixel electrode configuration for almost completely curbing the crosstalk of the voltage from the row line is implemented, and thus it is possible to provide the liquid crystal display apparatus of the high image quality with no crosstalk in a display period. In addition, according to this embodiment, it is possible, as there is little influence of the voltage variations of the common lines, to lower the voltage of the entire liquid crystal display apparatus by rendering the common lines alternating. Furthermore, as the pixel is comprised of the two active elements and the punch-through voltages of both active elements can be rendered equal, and thus it is possible to provide the liquid crystal display apparatus of the high image quality with no superimposition of a DC voltage.

(Embodiment 2)

Figure 10:
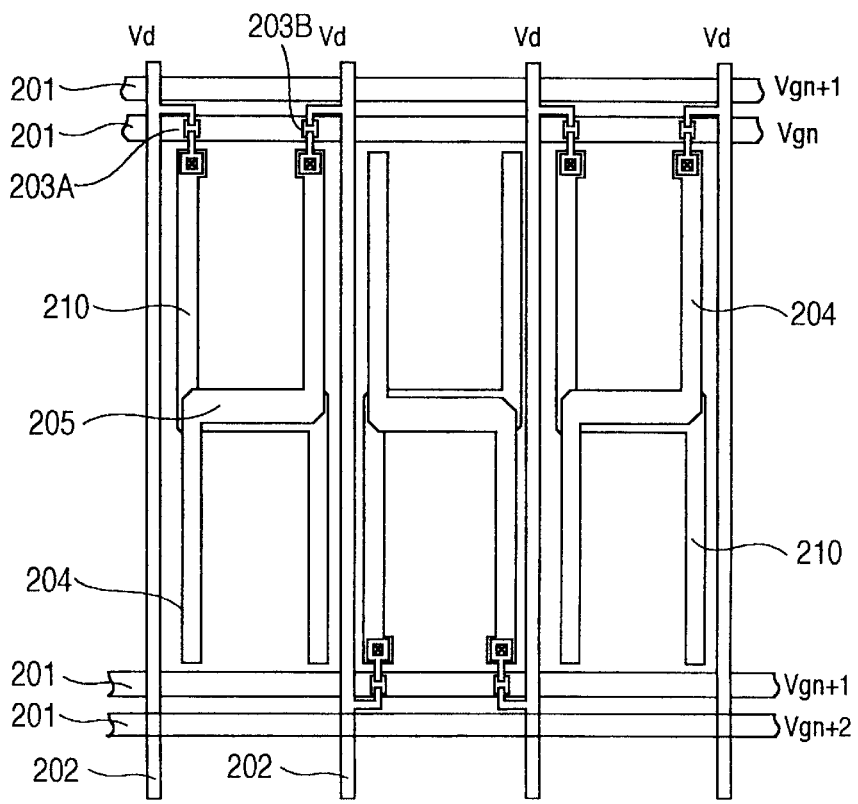
FIG. 10 is another pixel layout plan in an embodiment 2 of the present invention.
Figure 17:
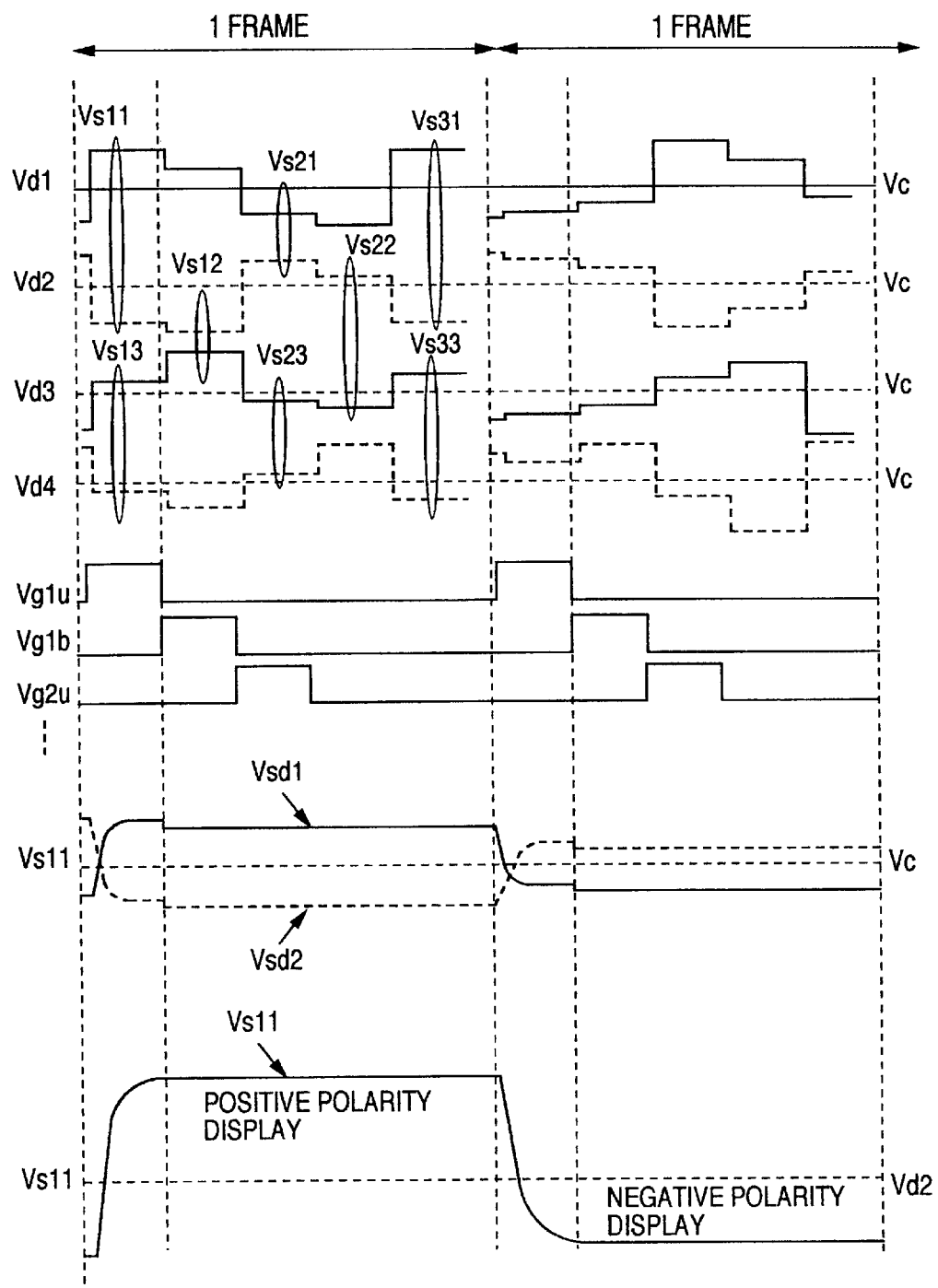
FIG. 17 is a driving sequence of the liquid crystal display apparatus in the embodiment 2 of the present invention.

A second embodiment of the present invention will be described by referring to FIGS. 10, 13 and 17. FIG. 10 is a pixel layout plan of this embodiment, FIG. 13 is the equivalent circuit diagram of the liquid crystal display apparatus using the pixel configuration shown in FIG. 10, and FIG. 17 is the driving sequence of the liquid crystal display apparatus of this embodiment.

Figure 13:
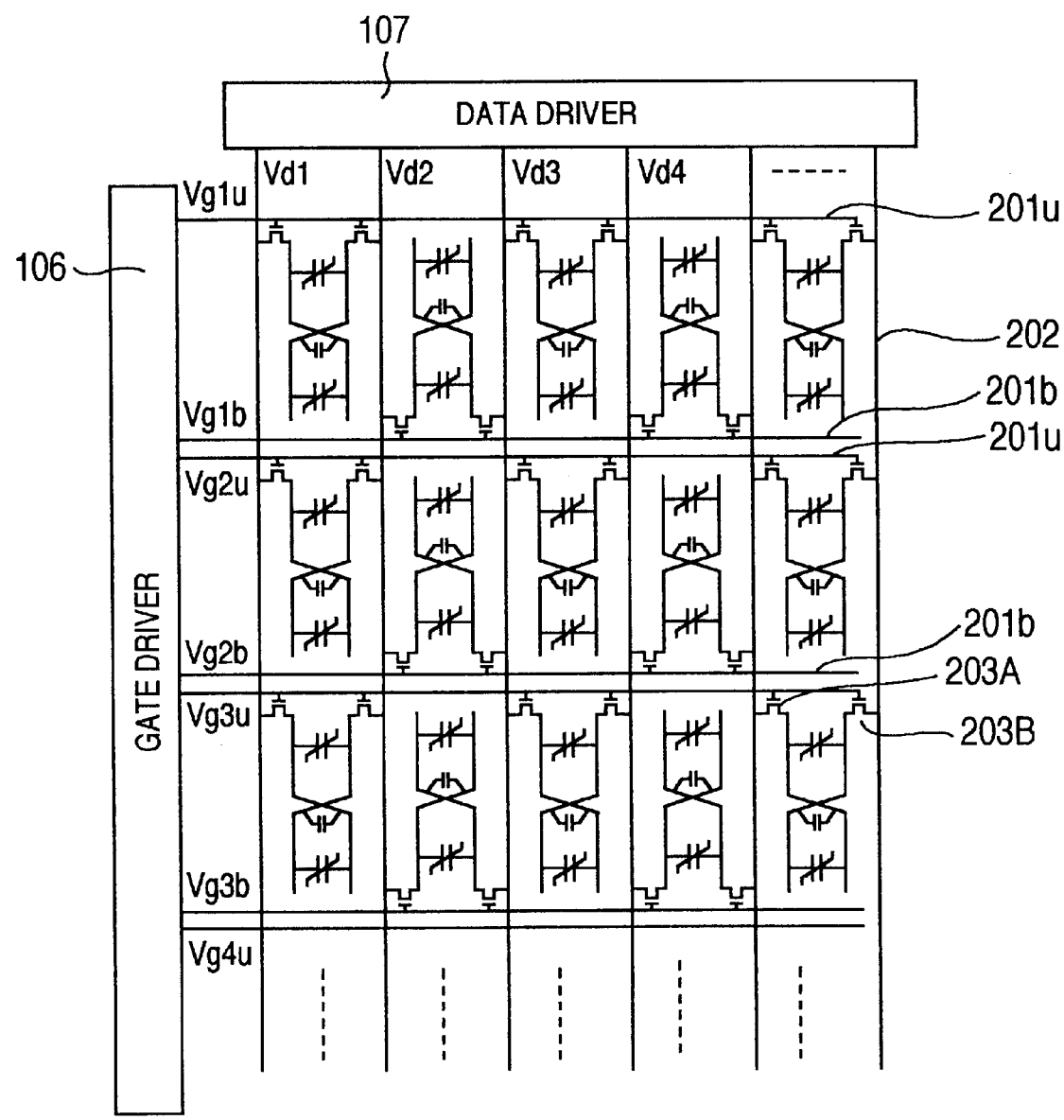
FIG. 13 is an equivalent circuit diagram of a liquid crystal display apparatus in the embodiment 2 of the present invention.

As for FIGS. 10 and 13, while the basic configurations therein are the same as the first embodiment of the present invention in FIG. 1, they are characterized in that the common lines are eliminated, the drain terminals of the two active elements are connected to the row lines on both sides, and the row lines are placed at the top and bottom of each individual pixel so that each individual row has a different row line as a gate electrode of the active element. As the common lines are eliminated, the voltage to be written to the pixel is the difference voltage of the adjacent row line. As the difference voltage is written, the number of pixels to which desired difference in the voltage can be written to is a half of the number of the row lines. Accordingly, as it is not possible to simultaneously write all the pixels comprising one line by one row line, the pixels comprising one line are divided into even-numbered rows and odd-numbered rows, and they are time-wise divided into two so as to have it written to each individual pixel. It is also possible, in this embodiment, to connect the second active element to the row line not involved in the writing of the pixel, that is, the row line for supplying the voltages of Vgn−1 or Vgn+2 in FIG. 10 for instance, instead of connecting it to the adjacent row line. In this case, as it is structurally almost the same as the embodiment 1, detailed description thereof will be omitted since the expected advantages and the driving modes are also the same.

The driving sequence will be described by referring to FIGS. 13 and 17. Of the two row lines 201u and 201b, the row line 201u is in charge of the writing to odd-numbered pixels, and writes the difference voltages between odd-numbered row lines and row lines on their right side, whereas the row line 201b writes to the even-numbered rows the difference voltages between the even-numbered row lines and the row lines on their right side after the writing to odd-numbered rows. For instance, the pixel on line 1 and in row 1 has a difference voltage Vs11 between a row line potential Vd1 and a row line potential Vd2 written thereto, and the pixel on line 1 and in row 2 has a difference voltage Vs12 between a row line potential Vd2 and a row line potential Vd3 written thereto. Here, it is set so that absolute values of the voltages applied to the adjacent row lines are always equal. It is thereby possible to reduce the maximum value of the required voltage and reverse the polarities of both row electrodes sandwiching the pixel centering on an average voltage Vc. It becomes possible, by reversing the polarities of the row electrodes sandwiching the pixel, to curb the crosstalk in the row direction as with the per-line inversion driving. On completion of the writing to each pixel, the punch-through voltages ΔVs are generated as the two active elements shift from on to off, but the difference voltage Vs11 applied to the pixel does not change since the punch-through voltages of the two active elements are equal. This scanning is repeated to the final line to complete the writing to one frame so as to display the image of one screen.

In this embodiment, there are twice as many row lines as the embodiment 1 and so it is necessary to write fast in half a selection time thereof, and yet it is no problem since both the load of gate writing and the load of pixel writing that determine the limit of the selection time are very light as compared with the embodiment 1, so that the display of high image quality can be implemented on the contrary. The load of writing will be described hereafter. The gate writing is governed by a row line writing-time constant. In this embodiment, while each row line has the capacitance of the intersection of the row line and the row line of one line and the gate capacitance of the active elements of half a line charged on selecting the writing, the capacitance load thereof can be rendered as light as a half thereof because there is no common line. As for the pixel writing, high-speed writing is possible in this embodiment since display performance is determined by the charging-time constant of the row line of light load capacitance and the writing-time constant of the active elements, whereas the high-speed writing is difficult in the configuration having the common line since it is necessary to sufficiently stabilize the potential due to increase in the charging-time constant caused by the high load of the common line itself and the influence of the voltage variation of the common line directly exerted over display quality. In this embodiment, it is possible to implement the writing to the pixel by the difference voltage without providing the common line because writing voltage to the pixel requiring sufficient writing can only be supplied from the row line of a light load.

As this embodiment is capable of determining the writing voltage to the pixel just by the potential difference between the adjacent row electrodes, it is possible to use an arbitrary driving mode. Although it is not described in detail here, it is feasible to easily implement the low-voltage driving by using the dot inversion driving mode for instance, and it is also feasible, as there is no superimposition of the DC components due to the punch-through voltage, to simplify a circuit method outside the display apparatus by using the low-voltage driving by the frame inversion driving mode.

This embodiment does not limit the active elements in particular, and so it is possible to use low-temperature polysilicon for forming not only an amorphous thin film transistor but a polycrystalline thin film transistor on the glass substrate, high-temperature polysilicon for forming the polycrystalline thin film transistor on a quartz substrate, or monocrystal silicon for forming the transistor on a monocrystal substrate. While the description of this embodiment is centering on the active element of an N type, it is also possible to use the active element of a P type which becomes conductive at a gate voltage lower than a source drain voltage. In particular, the low-temperature polysilicon, the high-temperature polysilicon or the monocrystal silicon using the polycrystalline thin film transistor or a monocrystal transistor has high writing ability and is suitable for the case where the high-speed writing is required as this embodiment.

While this embodiment does not especially require the shielding electrode to be provided, it is possible, in the case of further improving the image quality, to extend a projection-like electrode as if covering each row line from the adjacent row line or the row line prior or subsequent thereto and render it as the shielding electrode because the row line is a fixed potential except during a selected period and is usable as a voltage source for the shielding electrode.

Thus, this embodiment is capable of implementing the high-speed and high-accuracy writing compared with the cases of using the common line, and so it allows the display of the high image quality even in the display apparatus having a large screen and high resolution.

(Embodiment 3)

Figure 11A:
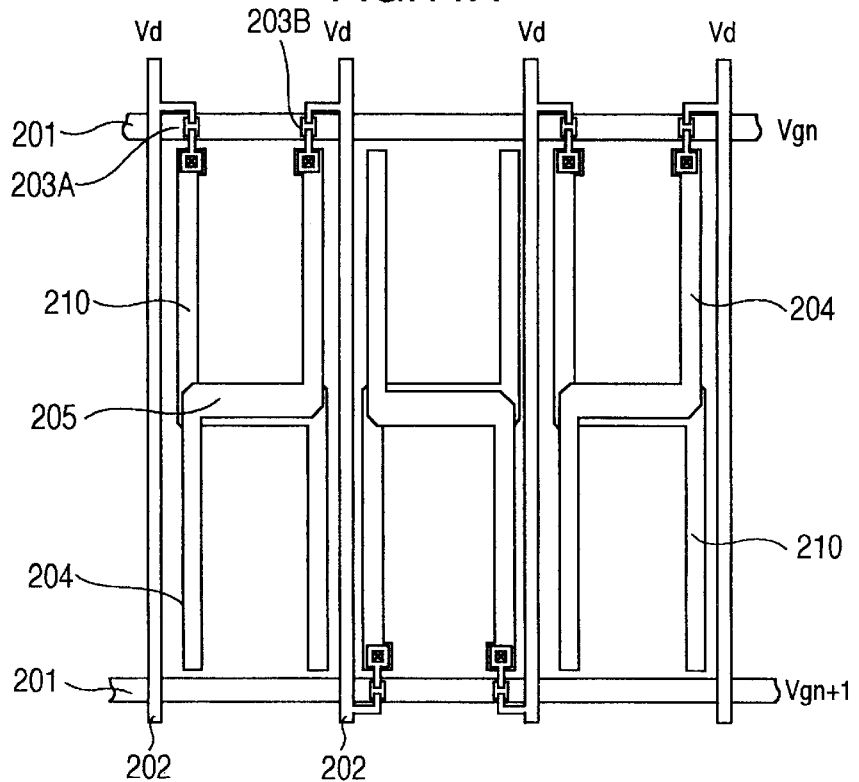
FIG. 11A is another pixel layout plan in an embodiment 3 of the present invention.
Figure 11B:
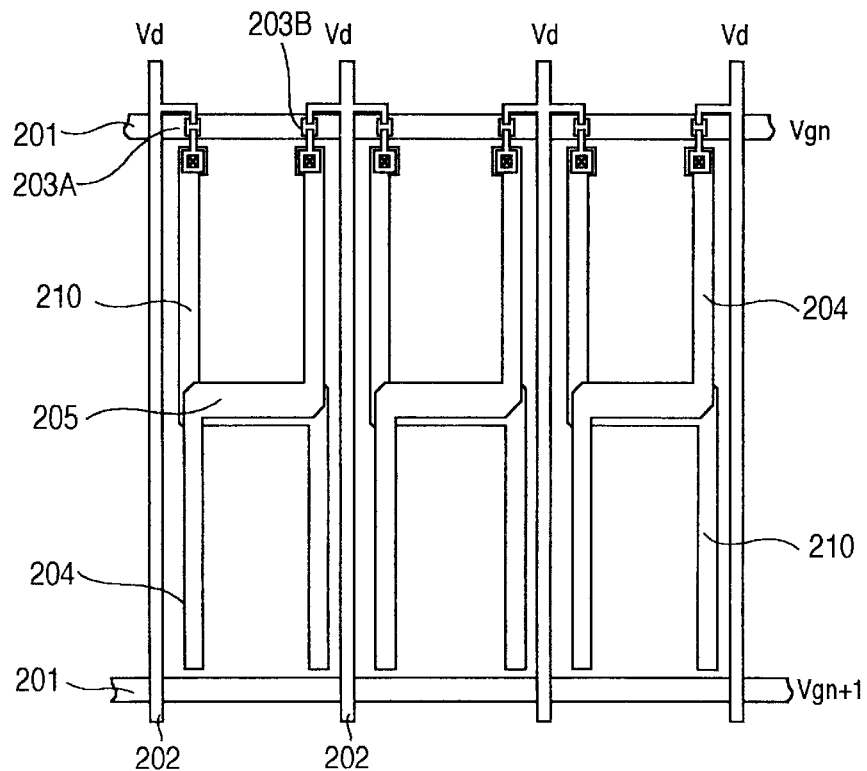
FIG. 11B is another pixel layout plan in the embodiment 3 of the present invention.
Figure 12:
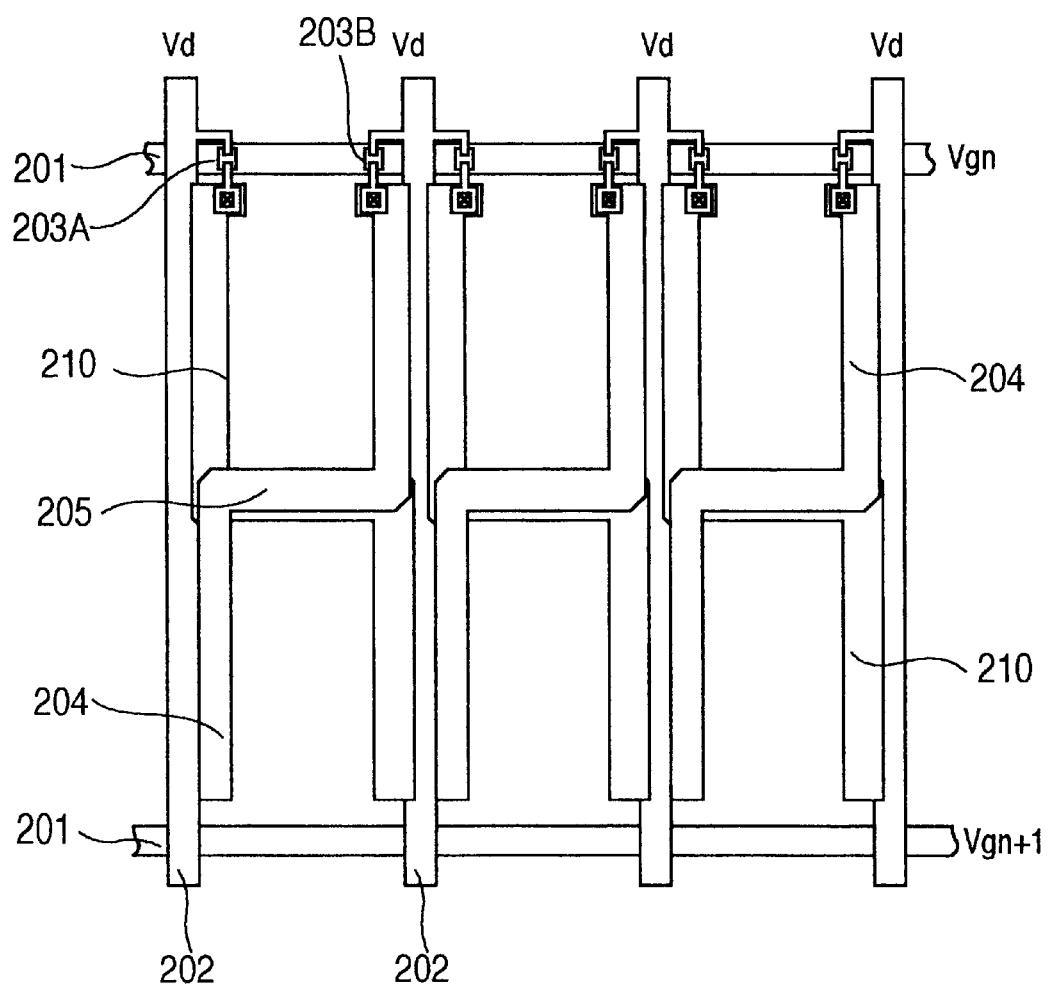
FIG. 12 is another pixel layout plan in the embodiment 3 of the present invention.
Figure 14:
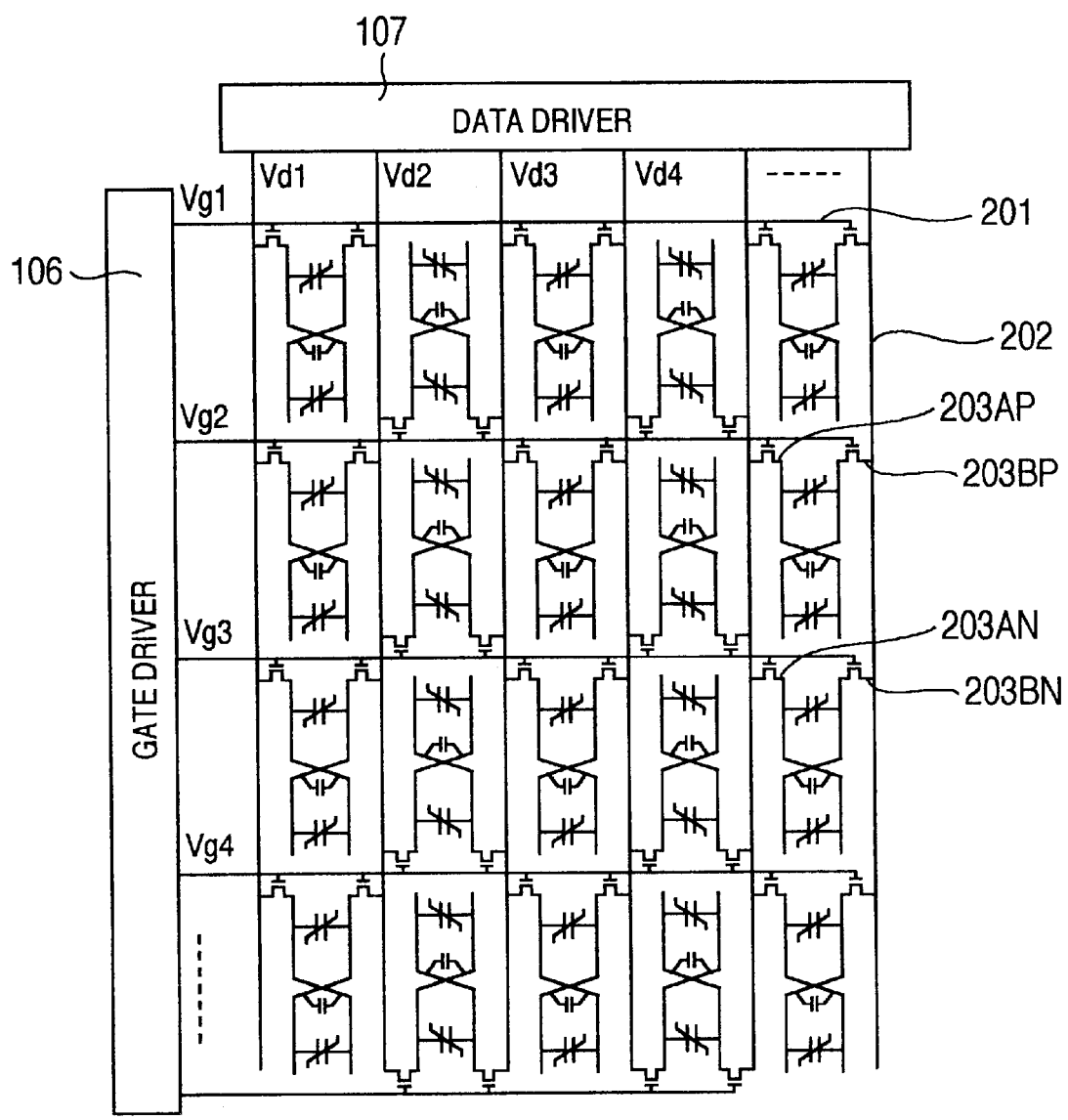
FIG. 14 is an equivalent circuit diagram of the liquid crystal display apparatus in the embodiment 3 of the present invention.
Figure 15:
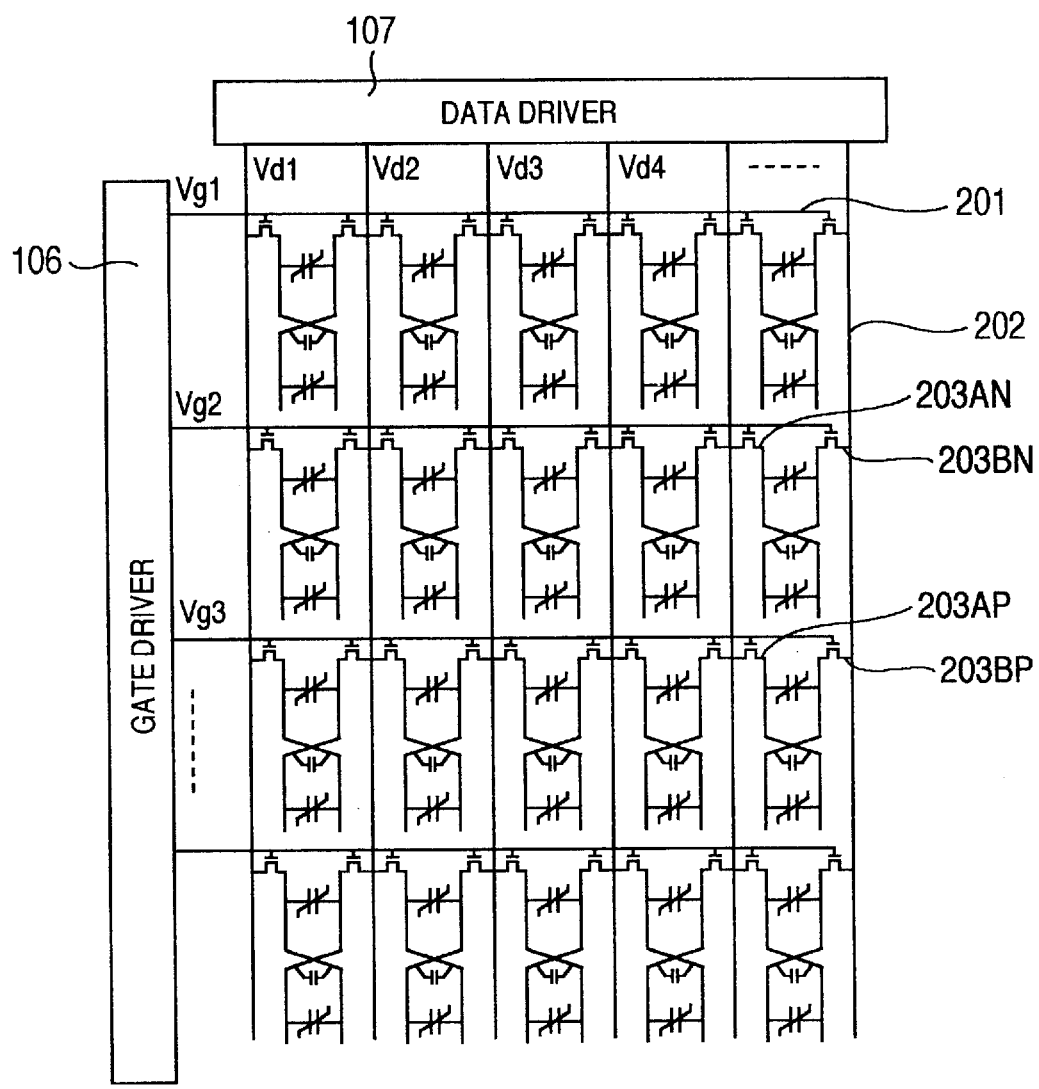
FIG. 15 is an equivalent circuit diagram of the liquid crystal display apparatus in the embodiment 3 of the present invention.

A third embodiment of the present invention will be described by referring to FIGS. 11 and 12, FIGS. 14 and 15, and FIGS. 18 and 19. FIGS. 11 and 12 are the pixel layout plans of this embodiment, FIGS. 14 and 15 are block diagrams of the liquid crystal display apparatus using the pixel configuration shown in FIGS. 11 and 12, and FIGS. 18 and 19 show the driving sequences of the liquid crystal display apparatus of this embodiment.

It will be described by referring to FIGS. 11A and 14. While the basic configuration is the same as the embodiment 2 of the present invention in FIG. 10, it is characterized by connecting the two active elements to the row lines on both sides and using, as driving element types, both the N type thin film transistors to be in conduction when the gate voltage is positive to the source drain voltage and the P type thin film transistors to be in conduction when negative so as to place the types adjacent to the active elements of which on and off are controlled by the same row line to be different in the row direction thereof. This embodiment is characterized, in particular, by using, for each individual line, a different type of active element to be connected to the pixels comprising each individual line, and controlling on and off of the active elements by the voltages of the different upper and lower row lines-on each individual line. In this embodiment, the N type active elements 203AN and 203BN are used on the odd-numbered lines, and the P type active elements 203AP and 203BP are used on the even-numbered lines. It is thereby possible to set one row line for driving the pixels on one line. While no shielding electrode is used in this embodiment, it is also possible to place the shielding electrodes by making use of the row lines as in the embodiment 2.

Figure 18:
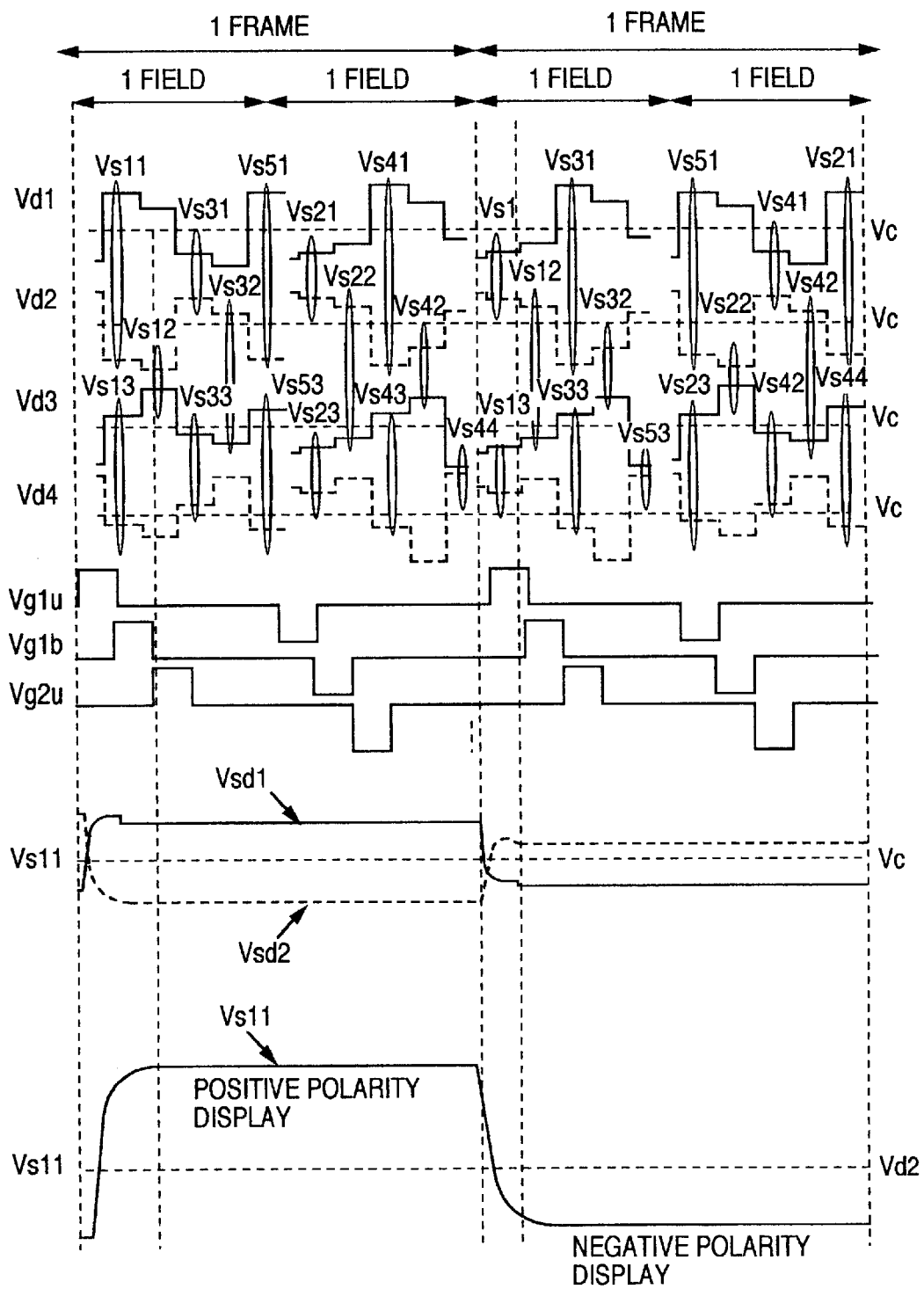
FIG. 18 is a driving sequence of the liquid crystal display apparatus in the embodiment 3 of the present invention.

The driving sequence will be described by referring to FIGS. 14 and 18. As shown in FIG. 18, this embodiment is applied to interlaced driving often used for animation such as a TV image, and it has the configuration wherein one frame is divided into two sub-frames. It is possible, by sequentially giving gate pulses Vg of the positive polarity to the row line 201, to complete the writing on one line by writing gate pulses on the line twice, and the interlaced driving for sequentially writing on the odd-numbered lines can be implemented by repeating it. Furthermore, it is possible, by sequentially giving the gate pulses Vg of the negative polarity in the next sub-field, to implement writing on the even-numbered lines. Thus, it is possible to represent the image of one frame.

In this embodiment, it is also possible to perform it by a series of scanning on the entire screen by applying the polarities of the gate pulses on the same row line in positive and negative time sequence.

FIG. 12 shows another pixel configuration according to this embodiment. While FIG. 12 has the equivalent circuit and the driving mode that are exactly the same as FIG. 11A, it has a different pixel layout. It is characterized by changing at least one of the thickness of the electrodes and the placement thereof performed so that the first and second pixel electrodes 210 and 204 overlap the row line 202. It thereby becomes possible, as there is no longer any gap between the row line 202 and the pixel electrodes 210 and 204, to omit an oblique optical layer extending in the row direction which is placed on the substrate on the opposite side for the purpose of improving the contrast ratio. As it thereby becomes no longer necessary to have a tolerance in mating of the upper and lower substrates, the opening ratio is improved enough to implement the bright liquid crystal display apparatus.

Another example of this embodiment will be described by referring to FIGS. 11B and 15. While the basic configuration is the same as the embodiment shown in FIG. 11A, it is characterized by connecting to one row line the active elements for controlling the writing to the pixels comprising one line and changing the type of the active elements in the row direction on each individual line. In this embodiment, the P type active elements 203AP and 203BP are used on the odd-numbered lines and the odd-numbered rows, and the N type active elements 203AN and 203BN are used on the odd-numbered lines and the even-numbered rows, and the even-numbered lines have the inverse configuration as shown in FIG. 15.

Figure 19:
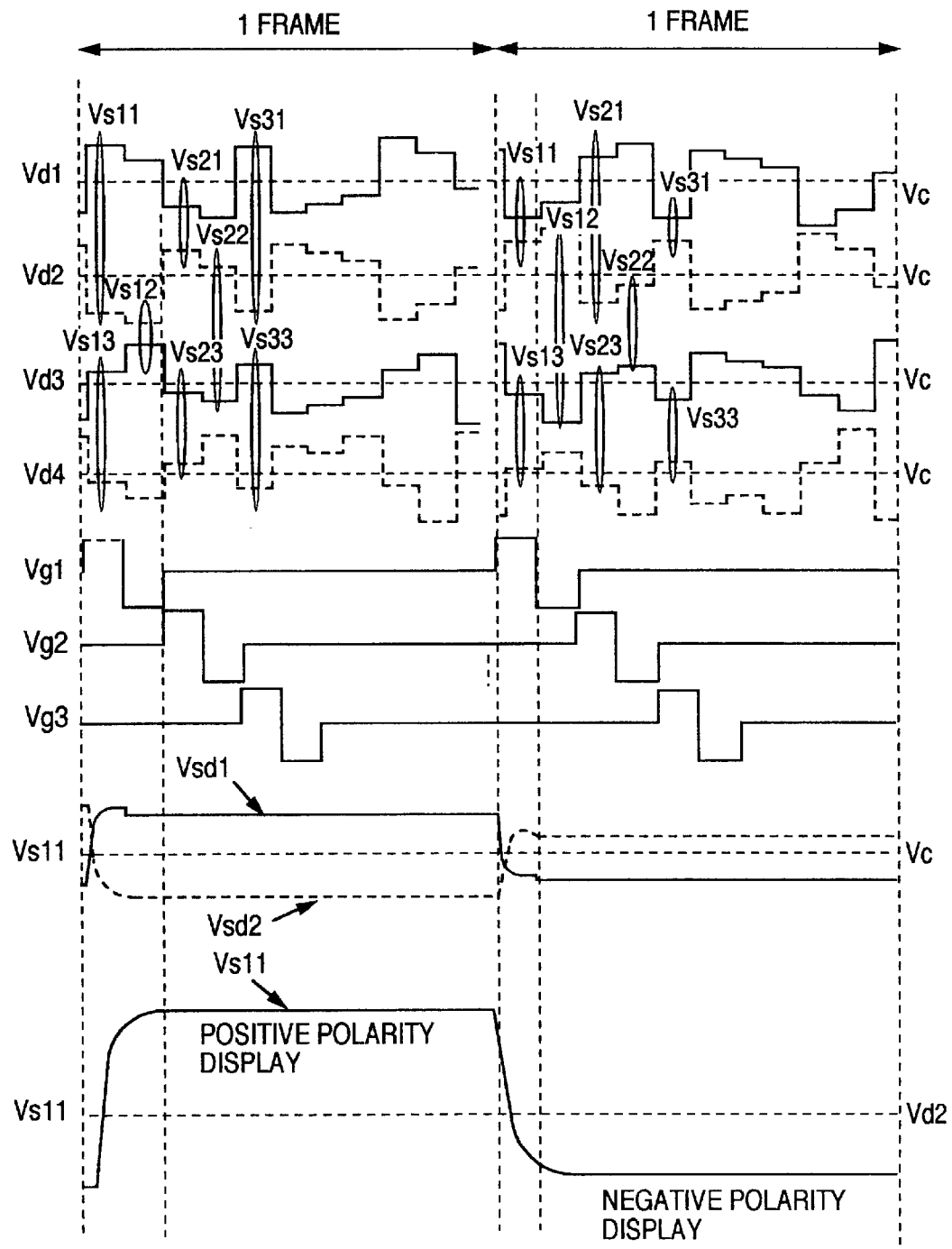
FIG. 19 is a driving sequence of the liquid crystal display apparatus in the embodiment 3 of the present invention.
Figure 20:
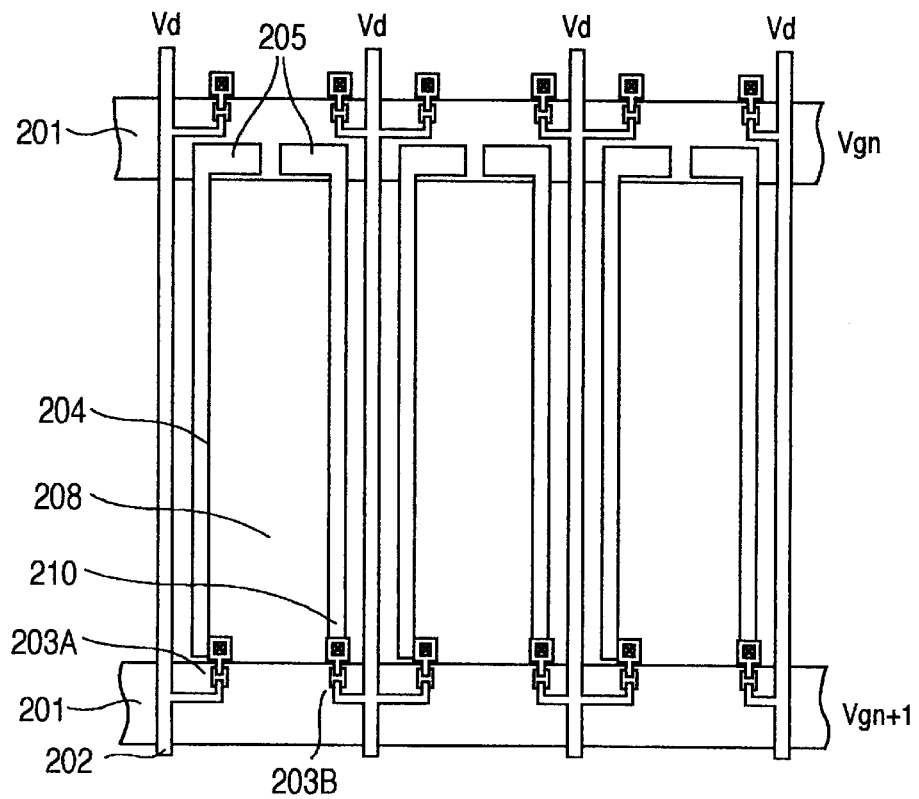
FIG. 20 is a pixel layout plan of the liquid crystal display apparatus in the in-plane switching mode in the past.
Figure 21:
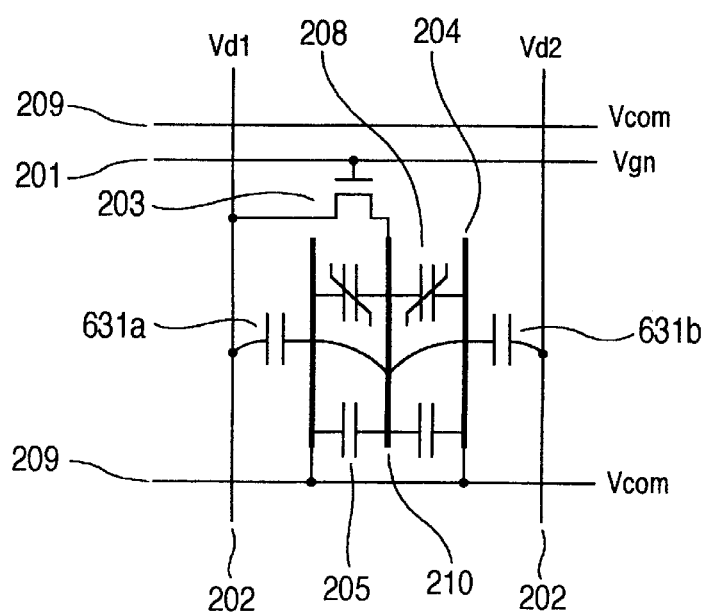
FIG. 21 is an equivalent circuit diagram of the liquid crystal display apparatus in the in-plane switching mode in the past.
Figure 22:
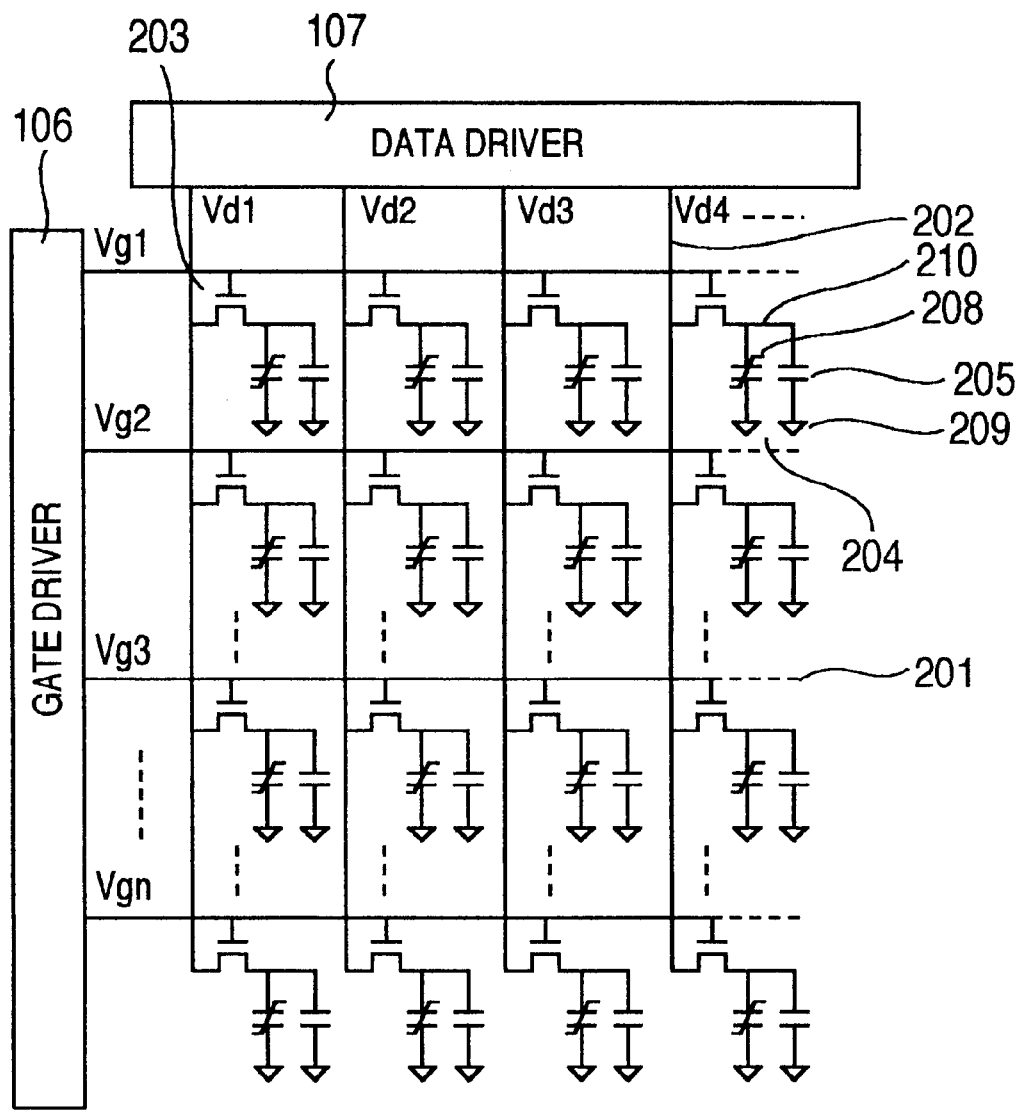
FIG. 22 is an equivalent circuit diagram of the liquid crystal display apparatus in the past.
Figure 23:
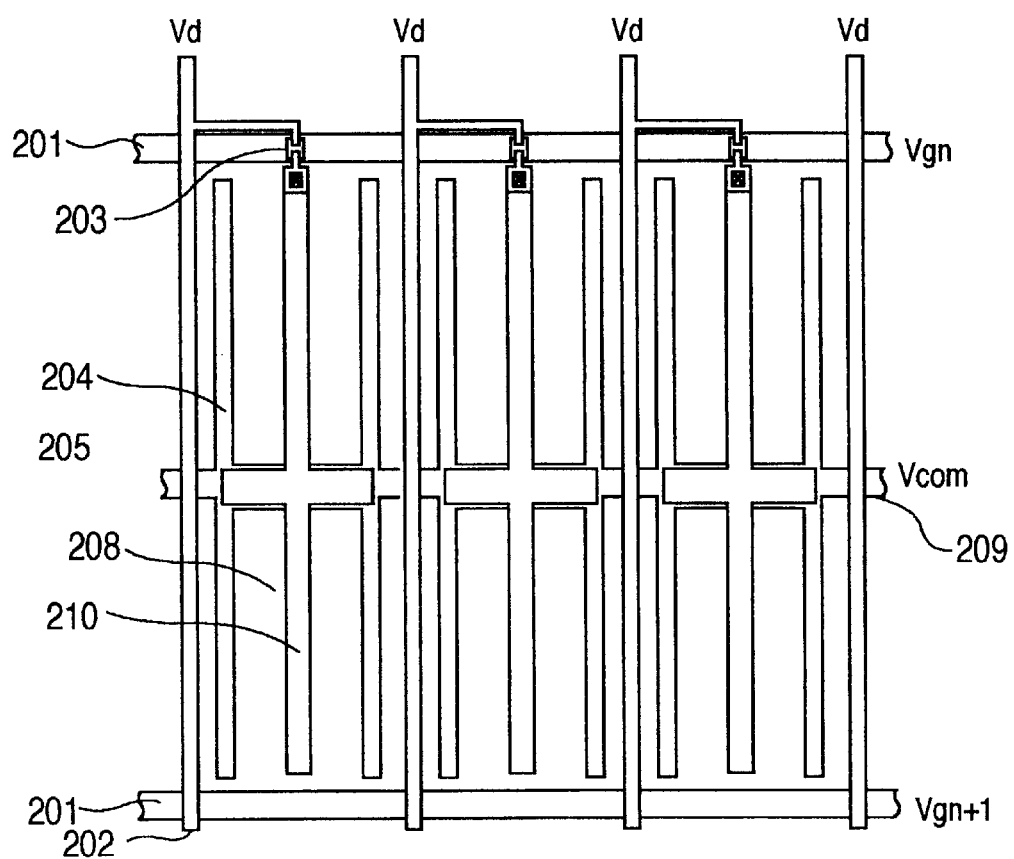
FIG. 23 is a pixel layout plan of the liquid crystal display apparatus in the in-plane switching mode in the past.

The driving sequence will be described by referring to FIGS. 15 and 19. As shown in FIG. 19, one frame is written by a series of scanning. The writing to one line is performed by applying the positive and negative gate pulses and thereby writing half a line each time. It is thereby possible to set one row line to the driving of the pixels on one line. In addition, this embodiment is the driving mode suited to non-interlaced driving for sequentially sending the image data of one frame such as an image source of a computer.

According to this embodiment, it is possible, as the common lines and the shielding electrodes can be omitted, to significantly curb the reduction in the opening ratio due to the common lines so as to allow the bright display of the high opening ratio.

It is suited to the interlaced driving.

According to the embodiments of the present invention, it is possible to implement the low-voltage driving for any driving mode and the pixel configuration having a small number of lines and the high opening ratio and also to curb image quality degradation due to the crosstalk so as to provide the liquid crystal display apparatus having the high image quality and capable of reducing the driving voltage and power consumption.

It should be further understood by those skilled in the art that the foregoing description has been made on embodiments of the invention and that various changes and modifications may be made in the invention without departing from the spirit of the invention and scope of the appended claims.

What is claimed is:

1. A liquid crystal display apparatus having: a pair of substrates of which at least one is transparent; and a liquid crystal layer supported between the pair of substrates, in which one of the pair of substrates has a plurality of row lines and a plurality of row lines, and pixels are placed corresponding to intersections of the plurality of row lines and the plurality of row lines, wherein: a first pixel electrode and a second pixel electrode are provided in the pixel, and a first active element is placed in the pixel and an output terminal thereof is connected to one row line adjacent to the first pixel electrode and the pixel, and the second active element is placed in the pixel and its output is connected to the other row line adjacent to the second pixel electrode, and besides, the first and second active elements are brought into conduction during a period of writing a voltage to a liquid crystal, and the first and second active elements are brought into a high resistance state during a holding period, and a difference voltage between the adjacent row lines is applied to the liquid crystal to display an image, and in addition, a capacitance between the row line and the first pixel electrode and that between the row line and the second pixel electrode are equal as to each row line adjacent to the pixel.

2. A liquid crystal display apparatus having: a pair of substrates of which at least one is transparent; and a liquid crystal layer supported between the pair of substrates, in which one of the pair of substrates has a plurality of row lines and a plurality of row lines, and pixels are placed corresponding to intersections of the plurality of row lines and the plurality of row lines, wherein: a first pixel electrode and a second pixel electrode are provided in the pixel, and a first active element is placed in the pixel and an output terminal thereof is connected to one row line adjacent to the first pixel electrode and the pixel, and the second active element is placed in the pixel and its output is connected to the other row line adjacent to the second pixel electrode, and besides, the first and second active elements are brought into conduction during a period of writing a voltage to a liquid crystal, and the first and second active elements are brought into a high resistance state during a holding period, and a difference voltage between the adjacent row lines is applied to the liquid crystal to display an image, and in addition, and a superimposing portion via a dielectric film of the first pixel electrode and the second pixel electrode is provided around the center in a row direction of the pixels, and moreover, the first pixel electrode and the second pixel electrode are formed to be in an axisymmetric relation in the row direction centering on the superimposing portion.

3. The liquid crystal display apparatus according to claim 2, wherein a holding capacitance is formed in the superimposing portion of the first and second pixel electrodes.

4. The liquid crystal display apparatus according to claim 2, wherein the pixels comprising one line are divided into a plurality of pixel groups, and the row lines equal to the number of the divided groups are provided to one line so that each row line controls writing of a predetermined pixel group.

5. The liquid crystal display apparatus according to claim 4, wherein the number of the pixel groups is two.

6. The liquid crystal display apparatus according to claim 1, wherein the first and second active elements are comprised of two types of active elements P and N, and each pixel is comprised of the active elements of the same type so that the type of the active element to be connected to each row line is different in each adjacent pixel.

7. The liquid crystal display apparatus according to claim 1, wherein the pixels comprising one line are divided into a plurality of pixel groups, and the first and second active elements are comprised of two types of active elements P and N, and each pixel is comprised of the active elements of the same type so that the type of the active element to be connected to each row line is different in each adjacent pixel group.

8. The liquid crystal display apparatus according to claim 6, wherein the first and second active elements are comprised of the two types of active elements P and N, and each pixel is comprised of the active elements of the same type, and the type of the active elements is changed on each line.

9. The liquid crystal display apparatus according to claim 6, wherein the display of all the elements is divided into a plurality of sub-frames so that a voltage is the same by the type of the active elements in one sub-frame.

10. The liquid crystal display apparatus according to any one of claim 1, wherein an average of the voltages written to the first and second pixel electrodes comprising the pixels is constantly fixed.

11. The liquid crystal display apparatus according to claim 1, wherein interlaced image data is inputted, and one line is comprised of two types of pixel groups so that selection time of one line is divided into two to write the image data of the respective pixel groups.

* * * * *